United States Patent
Kataumi et al.

[11] Patent Number: 5,899,115
[45] Date of Patent: May 4, 1999

[54] SHIFT SELECT LEVER DEVICE FOR AUTOMATIC TRANSMISSION

[75] Inventors: Yoshimasa Kataumi, Fuyaya; Yasuyuki Ikegami, Kosai, both of Japan

[73] Assignee: Fuji Kiko Co., Ltd., Tokyo, Japan

[21] Appl. No.: 08/738,978

[22] Filed: Oct. 24, 1996

[30] Foreign Application Priority Data

| Oct. 24, 1995 | [JP] | Japan | 7-275402 |
| Oct. 24, 1995 | [JP] | Japan | 7-275403 |
| Feb. 29, 1996 | [JP] | Japan | 8-42368 |
| Feb. 29, 1996 | [JP] | Japan | 8-42369 |
| Feb. 29, 1996 | [JP] | Japan | 8-42370 |
| Feb. 29, 1996 | [JP] | Japan | 8-42371 |

[51] Int. Cl.⁶ ............ B60K 20/04; F16H 59/10
[52] U.S. Cl. .................... 74/473.18; 74/473.12
[58] Field of Search ............ 74/473.18, 473.12, 74/473.25

[56] References Cited

U.S. PATENT DOCUMENTS

| 4,987,792 | 1/1991 | Mueller et al. | 74/473 |
| 5,044,220 | 9/1991 | Raff et al. | 74/473 |
| 5,062,314 | 11/1991 | Maier et al. | 74/475 |
| 5,070,740 | 12/1991 | Giek et al. | 74/473 |
| 5,150,633 | 9/1992 | Hiugärtner | 74/473.18 |
| 5,415,056 | 5/1995 | Tabata et al. | 74/473.18 X |
| 5,622,079 | 4/1997 | Woeste et al. | 74/473.18 X |
| 5,689,996 | 11/1997 | Ersoy | 74/473.18 |

FOREIGN PATENT DOCUMENTS

| 0 331 797 | 9/1989 | European Pat. Off. |
| 0 568 928 | 11/1993 | European Pat. Off. |
| 0 575 658 | 12/1993 | European Pat. Off. |
| 7-32902 | 2/1995 | Japan |
| 7-32903 | 2/1995 | Japan |
| 7-32904 | 2/1995 | Japan |
| 7-35224 | 2/1995 | Japan |

Primary Examiner—Charles A. Marmor
Assistant Examiner—David Fenstermacher
Attorney, Agent, or Firm—Foley & Lardner

[57] ABSTRACT

A shift lever device for an automotive automatic transmission is arranged so that a manual gear shift mode can be selected in addition to the a normal automatic gear shift mode. The shift lever device comprises a base bracket fixed on a vehicle body, a shift lever supported to the base bracket and a selector lever interconnected with an automatic transmission. The base bracket has an automatic mode shift slot, a manual mode shift slot parallel to the automatic mode shift slot and a switching slot connecting the automatic mode shift slot and the manual mode shift slot. The shift lever is extended over said base bracket so as to be moved through the automatic mode shift slot, the manual mode shift slot and the switching slot. The selector lever is integrally swung with the shift lever when the shift lever is put in the automatic mode shift slot. The selector lever is released from the shift lever when the shift lever is put in the manual mode shift slot to electrically execute a up-shift and down-shift through a fore-and-aft direction swing of the shift lever.

19 Claims, 30 Drawing Sheets

5,899,115

SHIFT SELECT LEVER DEVICE FOR AUTOMATIC TRANSMISSION

BACKGROUND OF THE INVENTION

The present invention relates to a shift-position select lever device for an automatic transmission mounted on an automotive vehicle, and more particularly to a shift-position select lever device through which a driver can select an automatic shift mode (A/T mode) and a manual shift mode (M/T mode).

Such a shift lever device is normally arranged to be utilized upon the automatic power transmission to select a particular gear shift mode by laterally swinging the shift lever with respect to a vehicle running direction. Japanese Patent Application First Publication No. Heisei 7-32902, No. 7-32903, No. Heisei 7-32904 and No. Heisei 7-35224 disclose several technological arts of such switchable shift lever devices for the automatic transmissions in which a switching between the automatic transmission mode and the manual power transmission mode can be easily and appropriately be executed in order to make the vehicle driver feel as if he or she were operating a manual power transmission.

However, such shift lever devices are further required to be improved in structure and design in order to ensure a smaller-size and a more preferable utility.

SUMMARY OF THE INVENTION

It is an object of the present invention to provide an improved shift lever device which is formed small and firmly executes its function.

A shift lever device according to the present invention is for an automotive automatic transmission. The shift lever device comprises a base bracket, a shift lever and a selector lever. The base bracket is fixed on a vehicle floor and has an automatic mode shift slot, a manual mode shift slot parallel to the automatic mode shift slot and a switching slot connecting the automatic mode shift slot and the manual mode shift slot. The shift lever is supported to the base bracket so as to be swingable in the fore-and-aft direction of an automotive vehicle. The shift lever is extended over the base bracket so as to be moved through the automatic mode shift slot, the manual mode shift slot and the swinging slot. The selector lever is interconnected with an automatic transmission through a linkage so as to change a shift position in an automatic shift mode. The selector lever is integrally swung with the shift lever when said shift lever is put in the automatic mode shift slot. The selector lever is released from the shift lever when the shift lever is put in the manual mode shift slot to electrically execute a up-shift and down-shift through a fore-and-aft direction swing of the shift lever.

DETAILED DESCRIPTION OF THE INVENTION

Referring to FIGS. 1 to 20, there is shown a first embodiment of a shift lever device of an automatic transmission for an automotive vehicle in accordance with the present invention.

Figure 1:
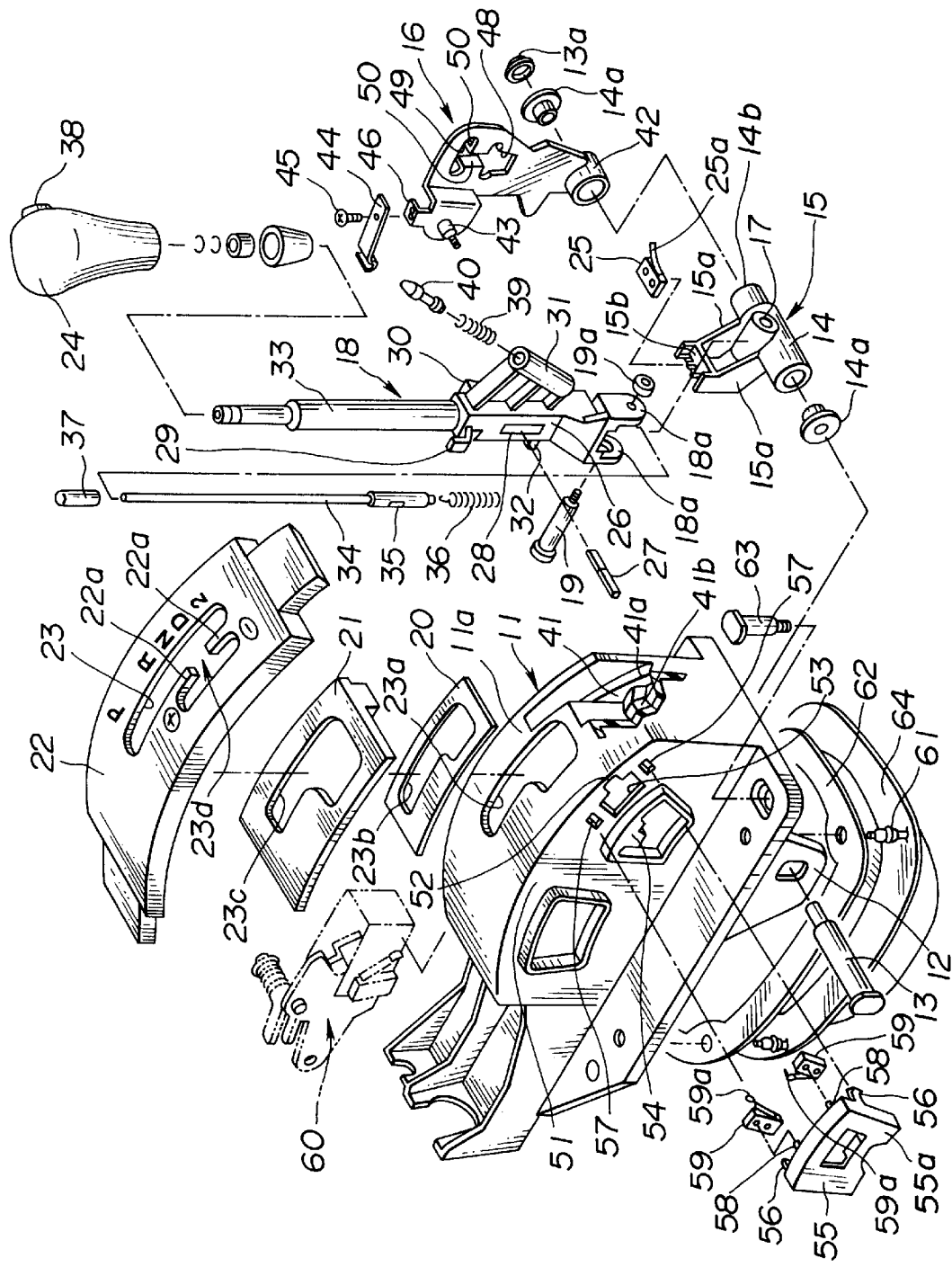
FIG. 1 is an exploded perspective view of a first embodiment of a shift lever device according to the present invention.

As shown in FIG. 1, a pair of hinge portions 12 are connected to a bottom portion of a base bracket 11 so as to project downward. A shift lever base 15 and a selector lever 16 are swingably supported to the hinge portions 12 through a shaft 13 which is rotatably installed to holes of the hinge portion 12.

The shift lever base 15 includes a cylindrical shaft 14 through which the shift lever base 15 is supported to the shaft 13 and a cylinder 17 which is perpendicularly connected with the cylindrical shaft 14. A shift lever main body 18 includes a pair of brackets 18a and 18a which are engaged with the cylinder 17 through a shaft 19 screwed with a nut 19a, so that the shift lever main body 18 is supported to the shaft 13 so as to be swingable in the lateral direction of the vehicle. The shift lever main body 18 extends upward so as to penetrate shift slots 23a, 23b, 23c, and 23 formed respectively to a top board 11a of the base bracket 11, a buffer member 20, a guide light plate 21 and an indicator 22. A knob 24 is installed to a top portion of the shift lever main body 18.

The shift slot 23 of the indicator 22 is formed in a generally H-shape and is defined by a pair of projecting parts 22a between which a switching slot 23c is formed. The shift slots 23a, 23b and 23c of the base bracket 11, the damper member 20 and the guide light plate 32 are respectively formed in a generally J-shape. The shift slots 23a, 23b and 23c are not seen from an operator since the base bracket 11, the damper member 20 and the guide light plate 32 are covered with the indicator 22. Further, the J-shaped slots 23a, 23b and 23c never degrade their function. Therefore, they are simply formed as compared with the shift slot 23 of the indicator 22 which is seen from vehicle occupants. Slide plates 22b and 22c are slidably disposed between the indicator 22 and the guide light plate 21 and are passed through by the shift lever main body 18.

Figure 14:
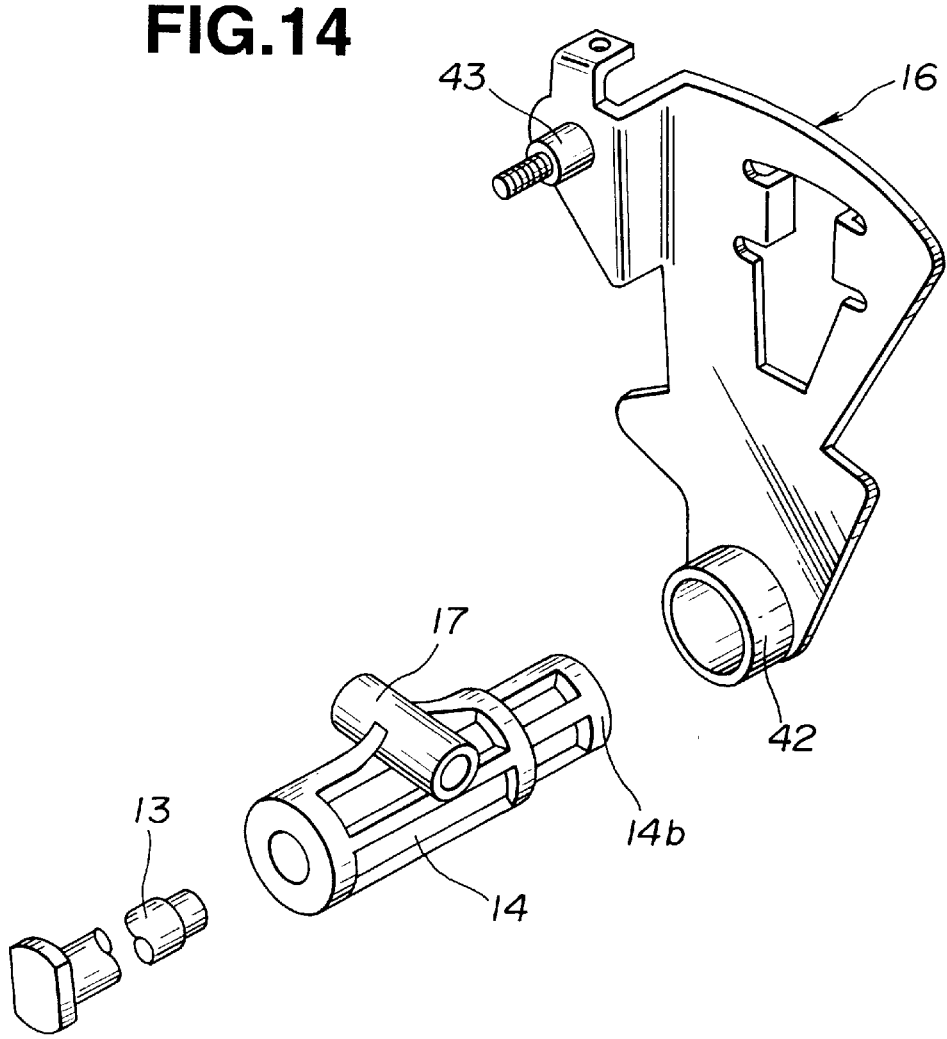
FIG. 14 is an exploded perspective view of an assembly between the selector lever and a cylindrical shaft of the shift lever device of FIG. 1.
Figure 15:
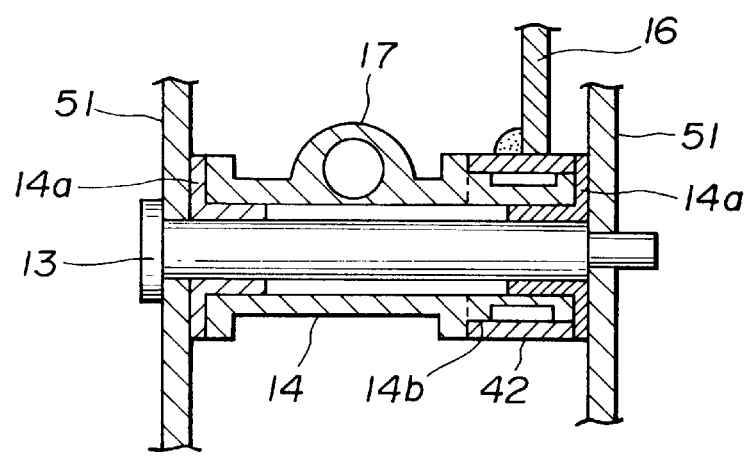
FIG. 15 is a partial cross-sectional view of FIG. 14.

As shown in FIGS. 1, 14 and 15, the shift lever base 15 is arranged such that the cylinder 17 is perpendicularly connected with the cylindrical shaft 14 and a pair of supporting portions 15a are connected to the cylindrical shaft 14 so as to sandwich the cylinder 17 and inclindedly project upward. Further, upper portions of the supporting portions 15a and 15a are connected with each other so as to form a U-shaped switch fixing portion 15b. A small cylinder 14b is axially connected with the cylindrical shaft 14. A cylindrical shaft 42 connected to the swinging base portion of the selector lever 16 is formed so that the inner diameter of the cylindrical shaft 42 is generally the same as the outer diameter of the small cylinder 14b and that the length of the cylindrical shaft 42 is generally the same as that of the small cylinder 14b. The small cylinder 14b is rotatably inserted into the cylindrical shaft 42. This overlapping between the cylindrical shaft 42 and the small cylinder 14b decreases the total length of the supporting structure of the cylindrical shafts 14 and 42.

Figure 16:
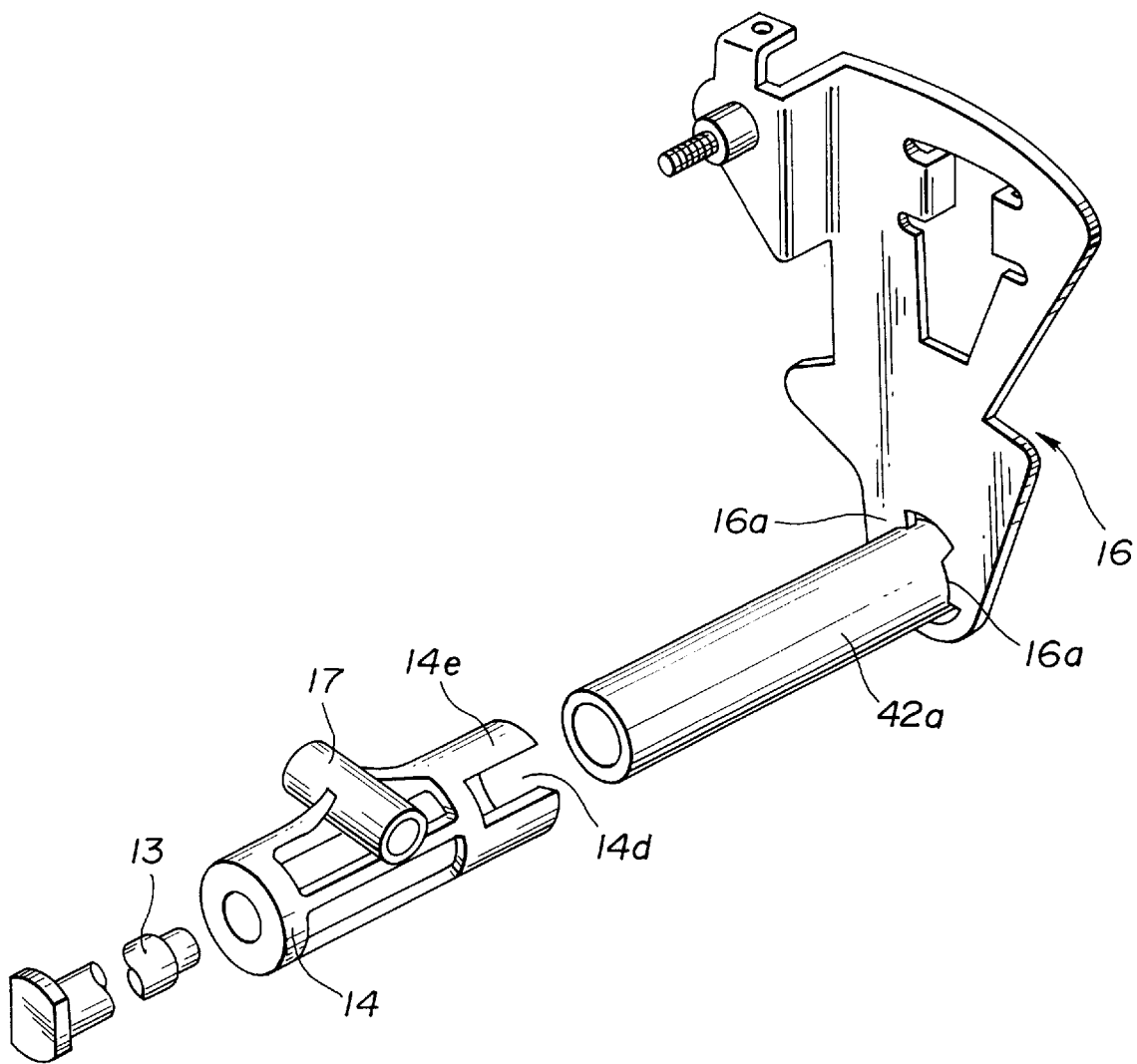
FIG. 16 is an exploded perspective view of a modification of the assembly between the selector lever and the cylindrical shaft of FIG. 14.
Figure 17:
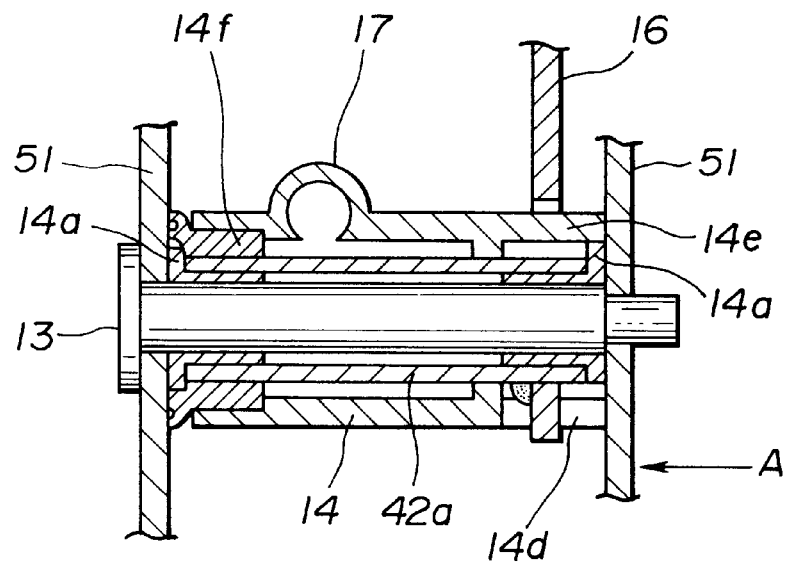
FIG. 17 is a partial cross-sectional view of FIG. 16.
Figure 18:
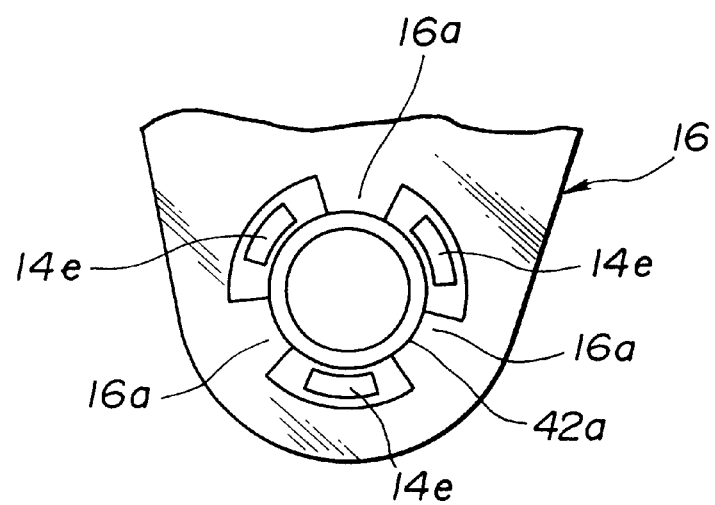
FIG. 18 is an enlarged partial view showing a connecting condition between the selector lever and the cylindrical shaft of FIG. 16.

Further, it will be understood that the above-mentioned supporting structure of the cylindrical shafts 12 and 42 may be modified as shown in FIGS. 16 to 18. That is, in this modification, an end portion of the cylindrical shaft 14 is elongated to form an elongated portion 14e. Three cutout portions 14d are formed to the elongated end portion 14a at equal intervals. A cylinder 42a is formed to have a length generally similar to the width between the side wall portions 51 and 51 and an outer diameter generally similar to the inner diameter of the elongated portion 14e. The cylinder 42a is fixed to a swing base portion 16a of the selector lever 16. The swing base portion 16a is formed so that the elongated portion 14e is inserted to the swing base portion 16a to enable the predetermined rotation of the cylindrical shaft 14 with respect to the selector lever 16. A pair of bushes 14a and 14a are connected to both ends of the cylinder 42a to decrease the play in the axial direction of the cylinders 14 and 42a. A bush 14f is inserted between the cylindrical shaft 14 and the cylinder 42a to decrease the play between the cylindrical shaft 14 and the cylinder 42a.

Figure 19:
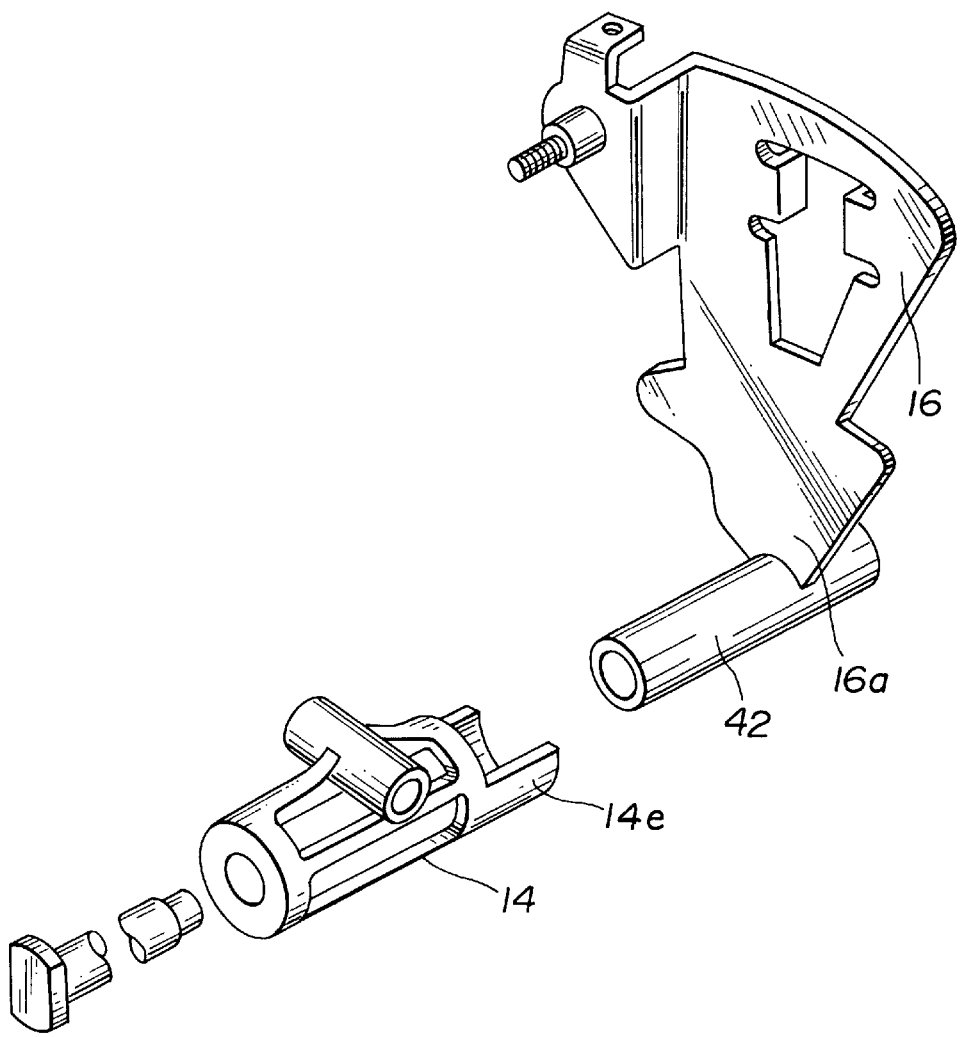
FIG. 19 is an exploded perspective view of another modification of the assembly between the selector lever and the cylindrical shaft of FIG. 14.
Figure 20:
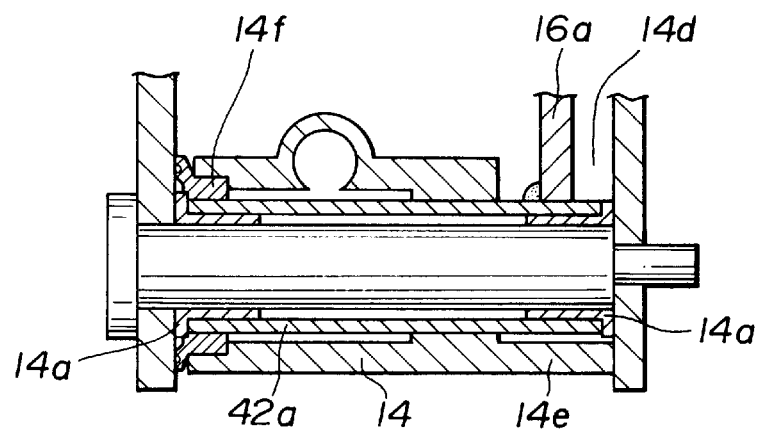
FIG. 20 is a partial cross-sectional view of FIG. 18.

Furthermore, another modification of the cylinder supporting structure of the cylindrical shafts 12 and the cylinder 42a are shown in FIGS. 19 and 20. In this modification, the cylinder shaft 14 is formed to have an elongated portion whose upper half portion is cut out. A swing base portion 16a of the selector lever 16 is formed to have a connecting top which is fixedly connected to a cylinder shaft 42a as shown in FIG. 19. The cylinder shaft 42a is inserted to the cylinder shaft 14 so that the cylinder shaft 42a can rotate for a predetermined angle such as until the selector lever 16 becomes in contact with the cutout end of the elongated portion 14e of the cylinder shaft 14. A pair of bushes 14a and 14a and a bush 14f are connected to ends of the cylinder 42a to decrease the play in the axial direction of the cylinders 14 and 42a.

As shown in FIG. 1, a limit switch 25 is fixed to the switch fixing portion 15b by engaging projections of the switch fixing portion 15b with holes of the limit switch 25. ON-and-OFF switching of the limit switch 25 is practically executed through the contact and release of an actuator 25a of the limit switch 25 with a projection 32 formed at a side surface of the shift lever main body 18. The limit switch 25 functions to input a selection signal between A/T mode and M/T mode to a control section of the automatic transmission.

Figure 2:
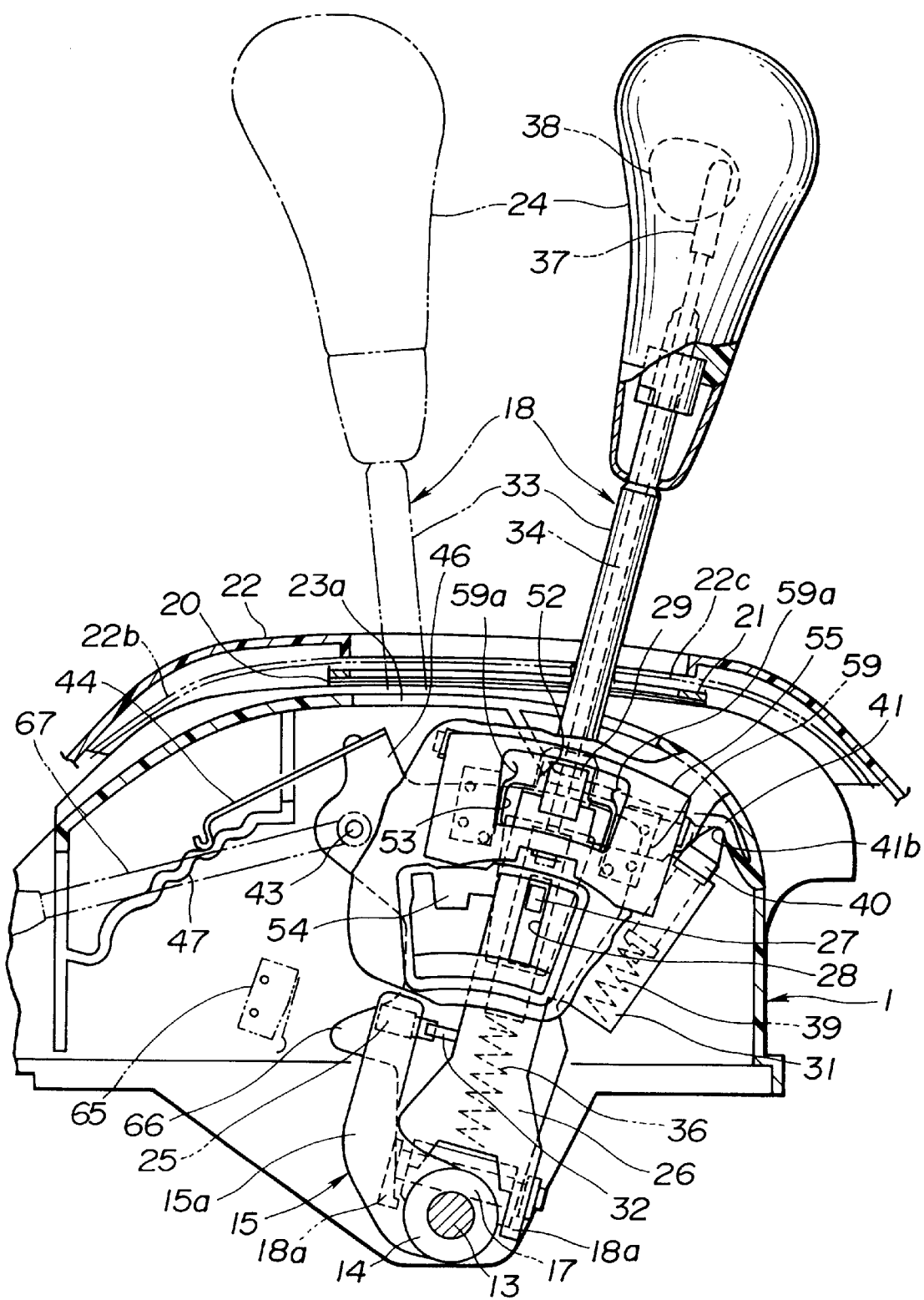
FIG. 2 is a side view of the shift lever device of FIG. 1.
Figure 3:
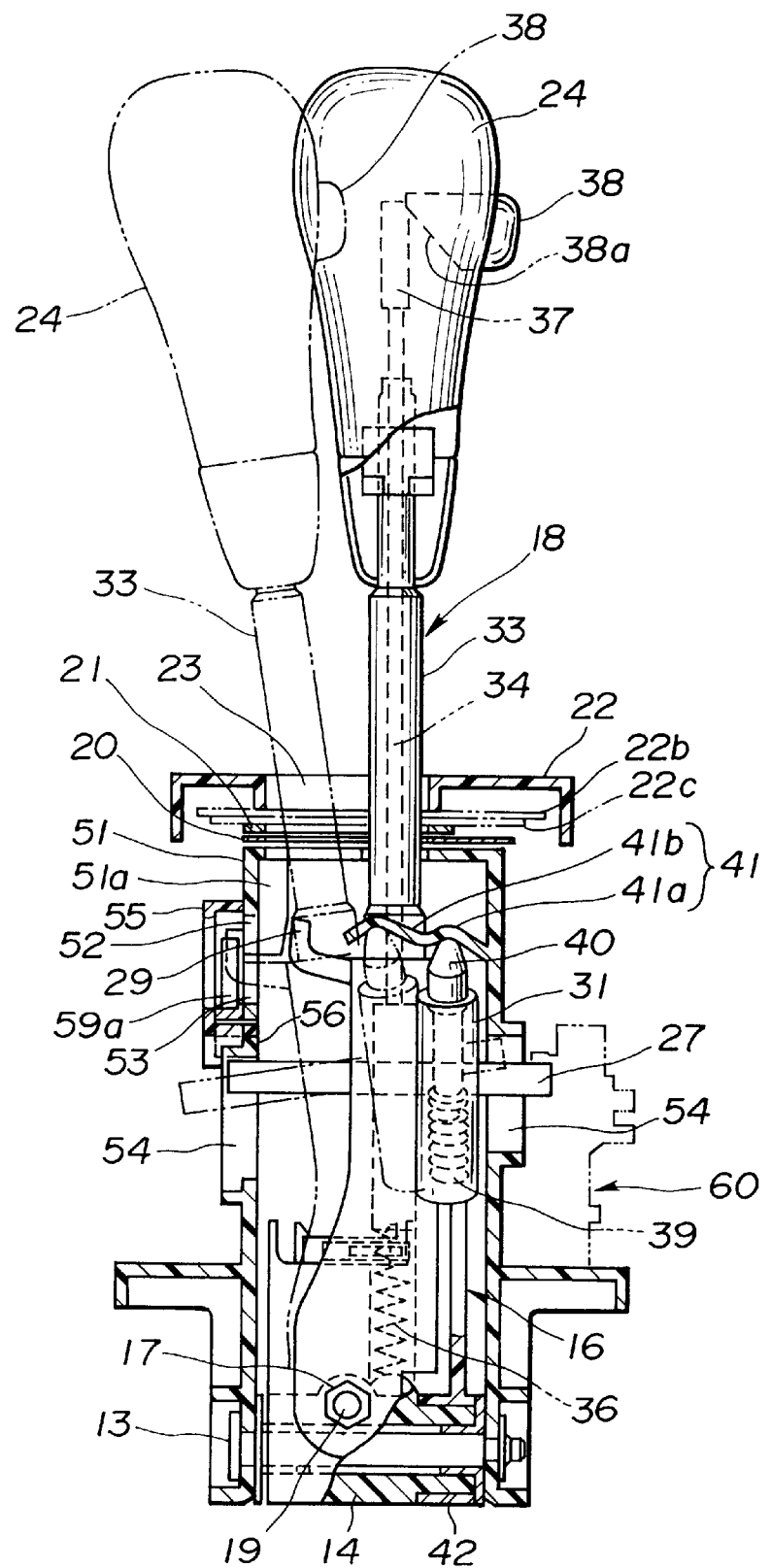
FIG. 3 is a front view, partly in cross section, of the shift lever device of FIG. 2.
Figure 4:
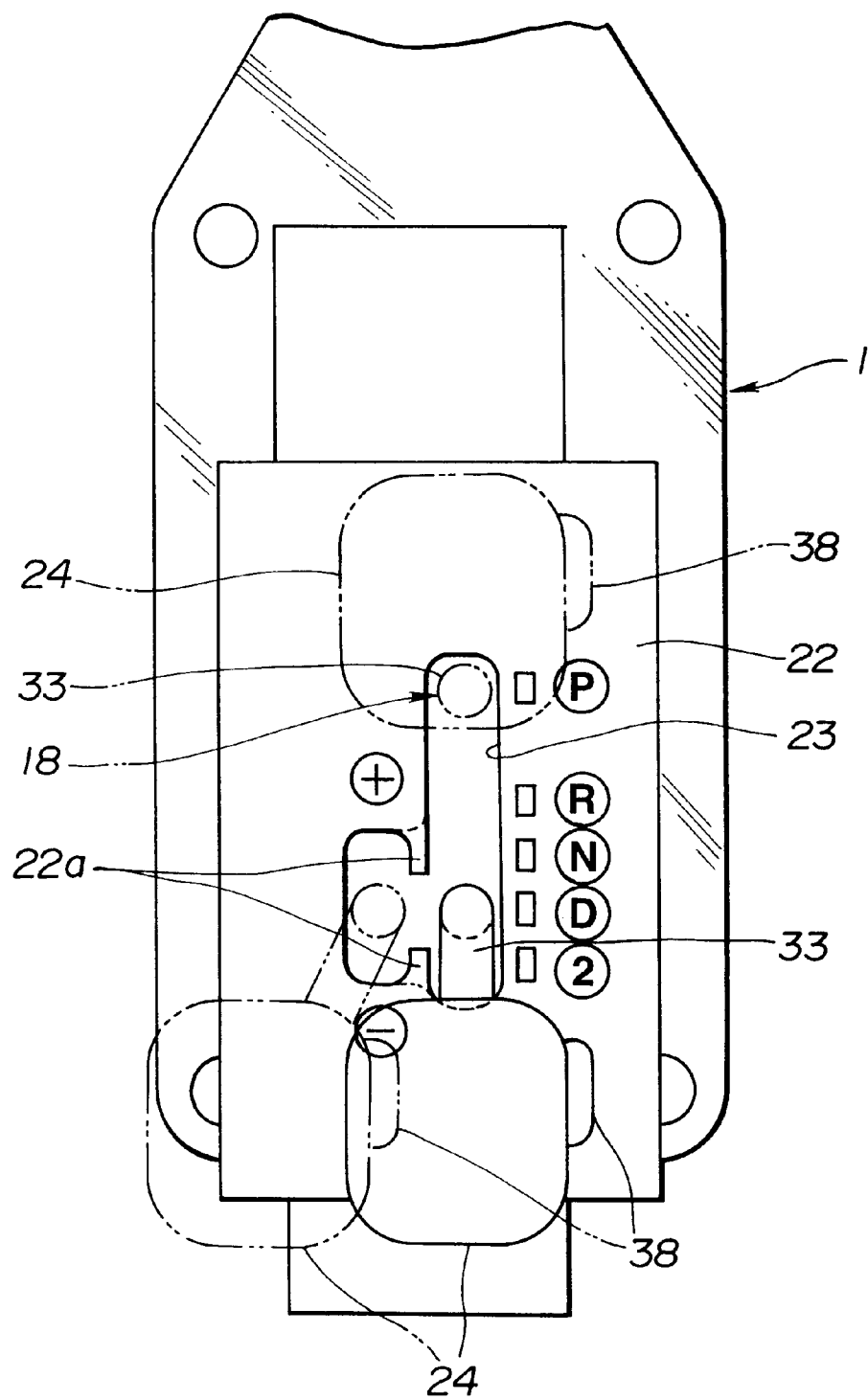
FIG. 4 is a plan view of the shift lever device of FIG. 2.

The shift lever main body 18 is constituted by integrally connecting the bracket portions 18a with a square column portion 26 and by integrally connecting the square column portion 26 with a two-step cylindrical column portion 33. The square column portion 25 has a slot 28 which is vertically extended and through which a position pin 27 passes so as to be vertically movable in the slot 28. In the vicinity of an upper portion of the square column portion 26, a stopper lever 29 is integrally formed. Opposite to the stopper lever 29, a projecting portion 30 is formed. The projection 32 for operating the actuator 25b of the limit switch 25 is formed at a lower portion of a front side surface of the square column portion 26. Further, a cylinder 31 obliquely and upwardly projects from a rear side surface of the square column portion 26. A compression rod 34 is inserted from a lower portion of the bracket portion 18a to the square column portion 26 and the cylindrical column portion 33 so as to penetrate the cylindrical column portion 33. A lower part of the compression rod 34 is formed to increase in diameter and have a hole 35 to which the position pin 27 is press-fittingly inserted. The lower end portion of the compression rod 34 is faced with the cylindrical shaft 17 of the shift lever base 15, and a coil spring 37 is biased therebetween. A top of the compression rod 34 is covered with a collar 37 and is extended into the knob 24 so as to be in contact with an oblique surface 38a of a knob button 38 installed to the knob 24, as shown in FIGS. 1 to 3.

Figure 9A:
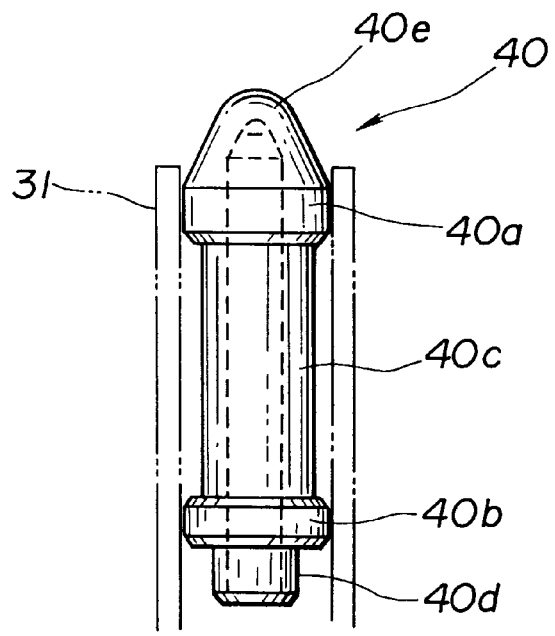
FIGS. 9A and 9B are side views of a ball-head projection shaft of the shift lever device of FIG. 1.
Figure 9B:
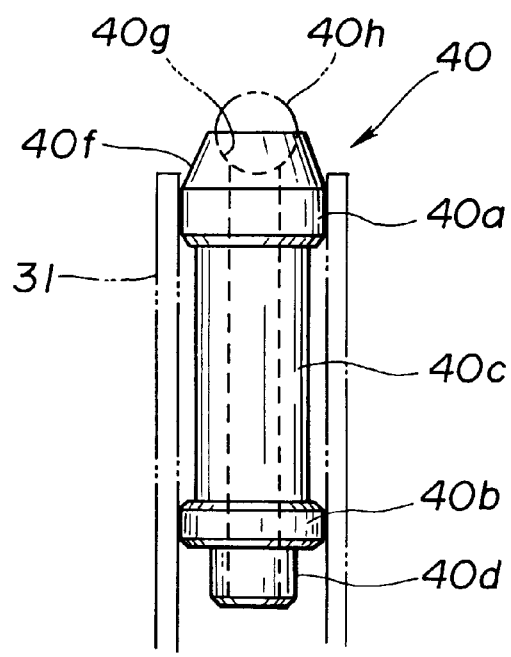

A coil spring 39 is inserted into the cylinder portion 31 so as to push a ball-head projection shaft 40. The ball-head projection shaft 40 is slidingly in contact with a moderate forming portion 41 formed at an inner surface of the base bracket 1. As shown in FIG. 9A, the ball-head projection shaft 40 includes upper and lower slide portions 40a and 40b which have diameters generally the same as the inner diameter of the cylinder portion 31 and a shaft portion 40c which is located between and integral with the upper and lower slide portions 40a and 40b. A ball-head portion 40e is formed at an end portion of the upper slide portion 40a. A spring receiving portion 40d is integrally formed at an end portion of the lower slide portion 40b. An axial center portion of the ball-head projection shaft 40 is formed tubular. Otherwise, the ball-head projection shaft 40 may be formed such that the ball-head portion 40e is replaced by a ball 40h and a ball-receiving portion 40g which is integral with the upper slide portion 40a and in which the ball 40 is rotatable, as shown in FIG. 9B.

The ball-head projection shaft 40 functions to prevent loosened feeling during the shaft operation by the two slide portions 40a and 40b.

Figure 10:
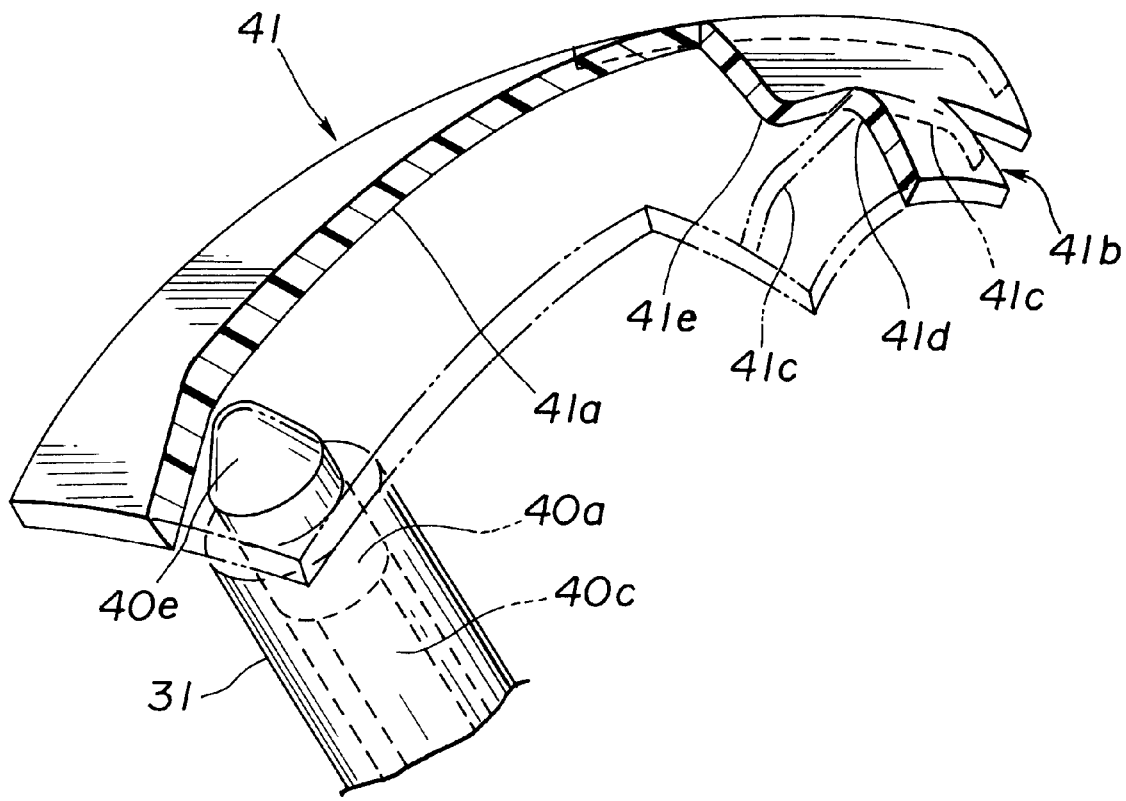
FIG. 10 is a perspective view, partly in cross section, of a moderate limit forming portion and a neutral limiting portion formed integrally on the base bracket of FIG. 1.
Figure 11:
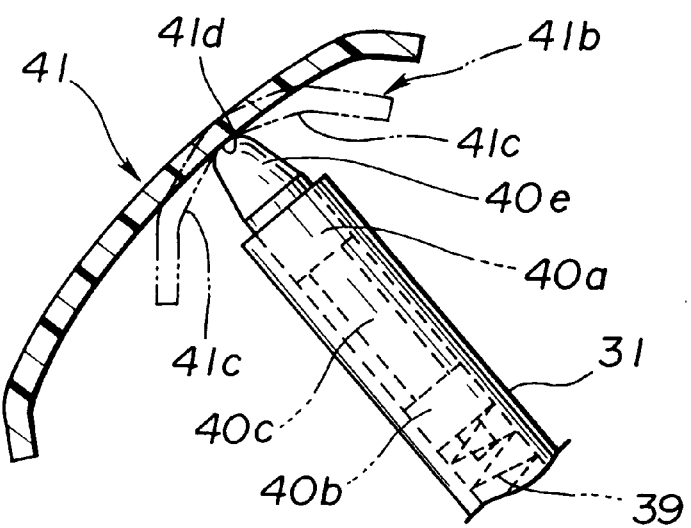
FIG. 11 is a cross-sectional side view of the neutral limiting forming portion of FIG. 10.

The moderate forming portion 41 is constituted by a circular arc portion 41a and a neutral restricting portion 41b, as shown in FIGS. 10 and 11. The circular arc portion 41a is formed such that a groove on which the ball-head portion 40e or ball 40h of the ball-head projection portion 40 contactingly slides in the A/T shift mode is formed on the predetermined radius on the shaft 13. The circular arc portion 41a is is formed on the inner surface of the side wall portion 51 of the base bracket 11. The neutral limiting portion 41b is integrally formed so that the ball-head portion 40e or ball 40h of the ball-head projection shaft 40 is engaged with the neutral limiting portion 41b when the shift lever main body 18 is put in the M/T mode shift slot adjacent to the D-range. The neutral limiting portion 41b includes a valley portion 41d at its center portion in the D-range and inclined surfaces 41c, 41c which are disposed to sandwich the valley portion 41d in the fore-and-aft direction. The neutral limiting portion 41b includes a valley shaped groove in the lateral cross-section, and the ball-head portion 40e or ball 40h of the ball-head projection shaft 40 is slidably in contact with the groove of the neutral limiting portion 41b. Therefore, the ball-head projecting shaft 40 integrally rotated with the shift lever main body 18 is slid so as to be located at a center of the groove in the lateral direction even if the shift lever main body 18 is swung in the fore-and-aft direction. This prevents the play of the shift lever main body 18 in the lateral direction.

Figure 12:
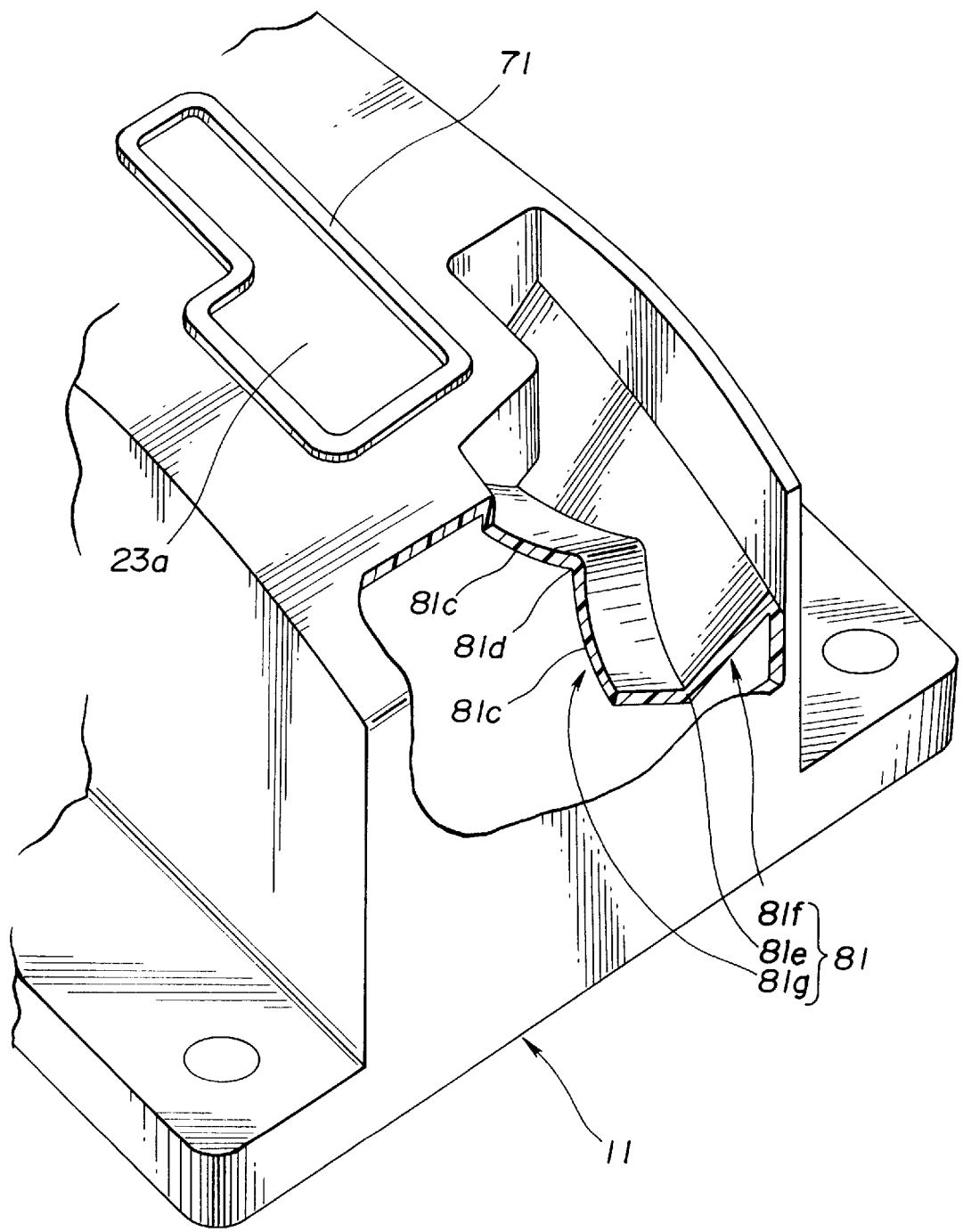
FIG. 12 is a perspective view of a modification of the base bracket of FIG. 1.
Figure 13:
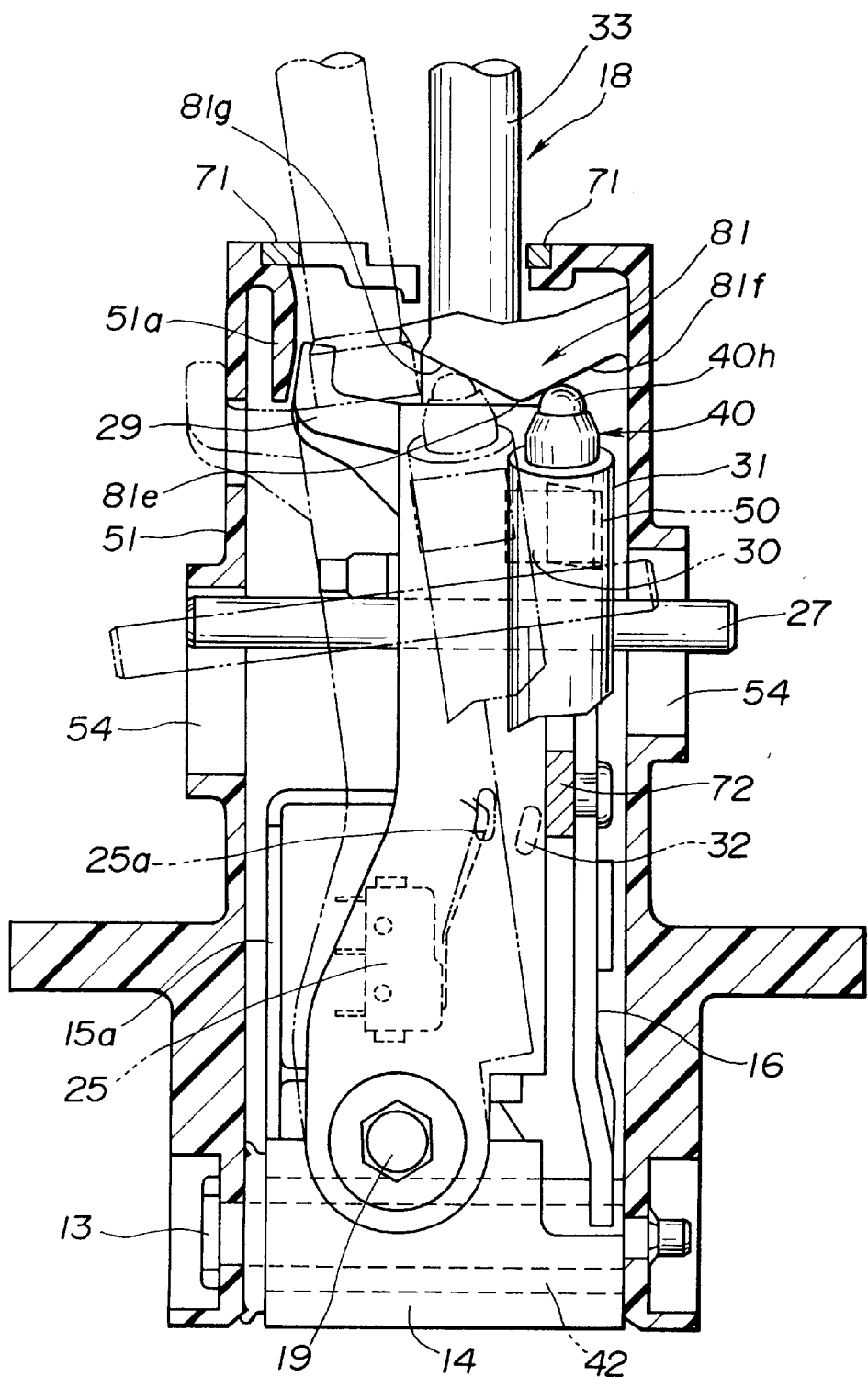
FIG. 13 is a cross-sectional front view of a shift lever device applying the base bracket of FIG. 12.

FIGS. 12 and 13 show a modification of the moderate forming portion 41. The modified moderate forming portion 81 formed inside of the base bracket 11 includes a circular arc portion 81f and a neutral limiting portion 81g. The circular arc portion 81f is constituted by an oblique surface which is downwardly and obliquely extended from the right side wall 51 of the base bracket 11 to the neutral limiting portion 81g. When the shift lever main body 18 is put in the A/T mode, the ball-head projection shaft 40 slides on the oblique surface while being biased in the right hand side in FIG. 13. Further, a stopper member 72 is installed to the selector lever 16 so as to be in contact with a side surface of the square column portion 26 in the A/T mode. Therefore, it becomes possible that the projecting portion 30 of the shift lever main body 18 is firmly engaged with the projection guide portions 50 of the selector lever 16 and that the play of the shift lever main body 18 in the lateral direction is suppressed.

The neutral limiting portion 81g is formed adjacent to the D range position of the circular arc portion 81f. The neutral limiting portion 81g is constituted by an oblique surface which is upwardly and obliquely extended from a top portion 81a formed between the circular arc portion 81f and the neutral limiting portion 81g. When the shift lever main body 18 is put in the M/T mode, the ball-head projection shaft 40 slides on the oblique surface of the neutral limiting portion 81g while being biased in the right hand side in FIG. 13. The neutral limiting portion 81g has a valley portion 81d which is formed at a lateral side of the D range position and which is defined by oblique surfaces 81c and 81c oblique in the fore-and-aft direction. Therefore, when the shift lever main body 18 is put in the M/T mode, the shift lever main body 18 is biased toward the left hand side of FIG. 13 due to the biasing force applied to the ball-head projection shaft 40. The shift lever main body 18 is in contact with a side of the M/T mode of the shift slot 23a of the bracket. A damping member is installed to a periphery defining the shift groove 13a to prevent noise from being generated by contact between the shift lever main body 18 and the base bracket 11.

Figure 7:
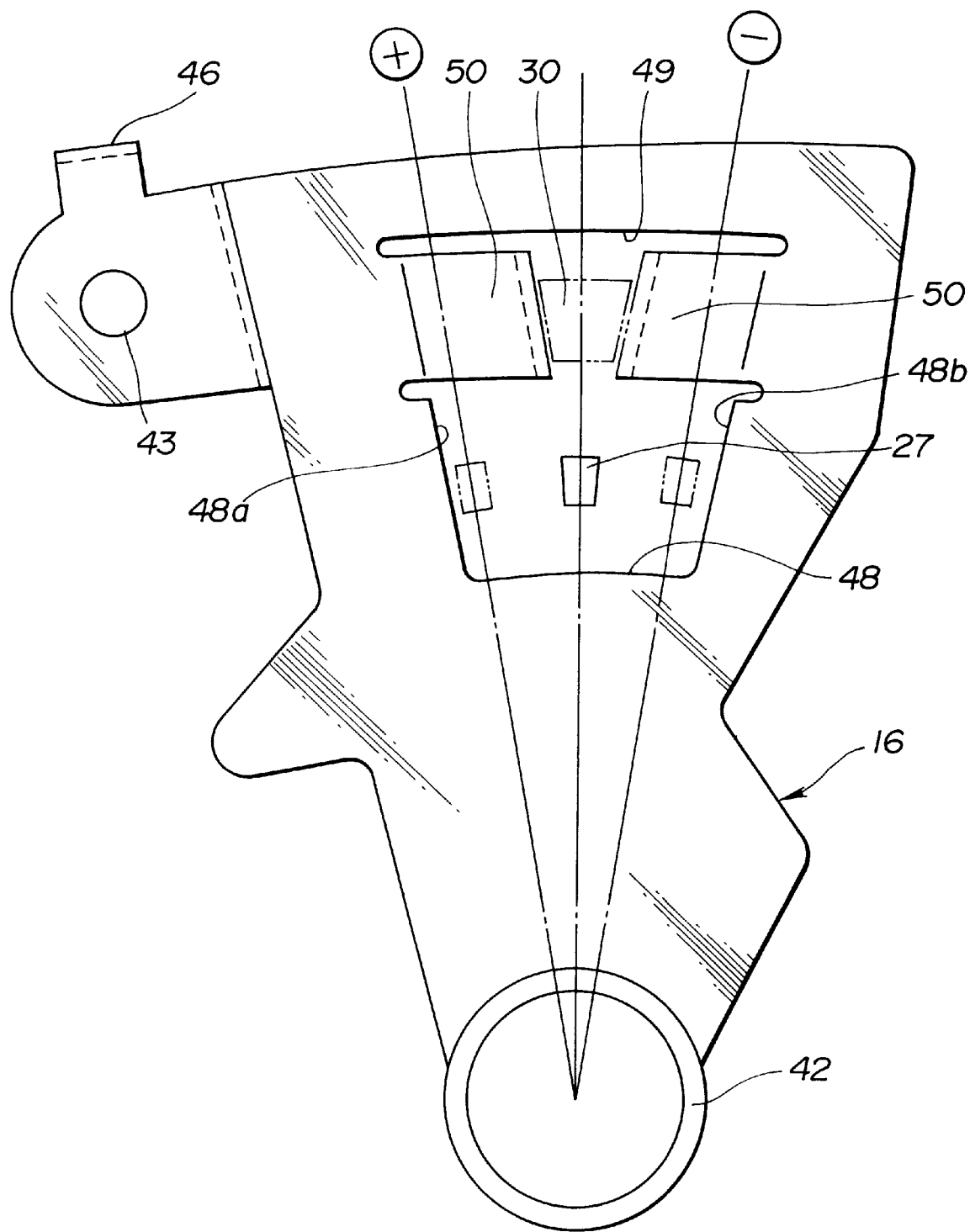
FIG. 7 is a front view of a selector lever of the shift lever device of FIG. 1.
Figure 8A:
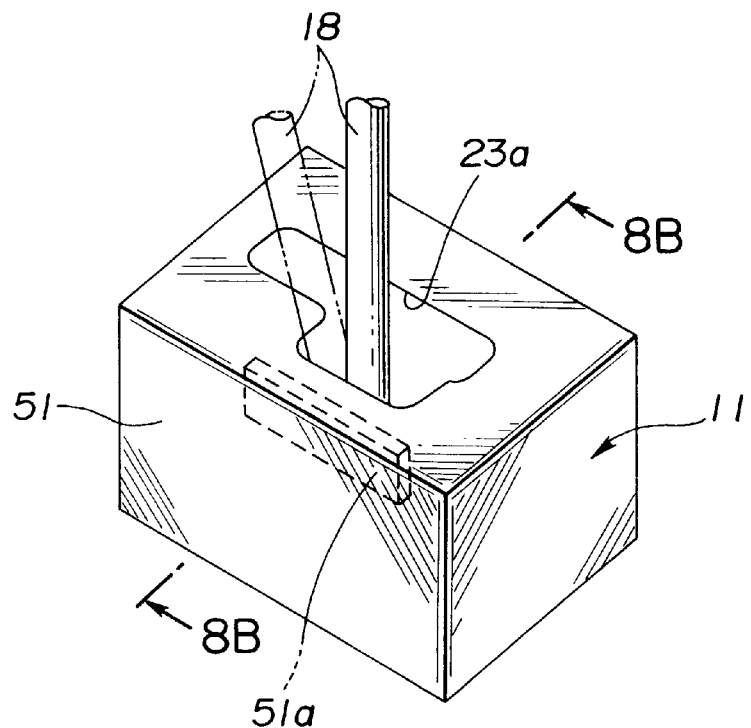
FIGS. 8A and 8B are schematic perspective view and a backside view showing a relationship between the projecting portion and a base bracket of the shift lever device of FIG. 1.
Figure 8B:
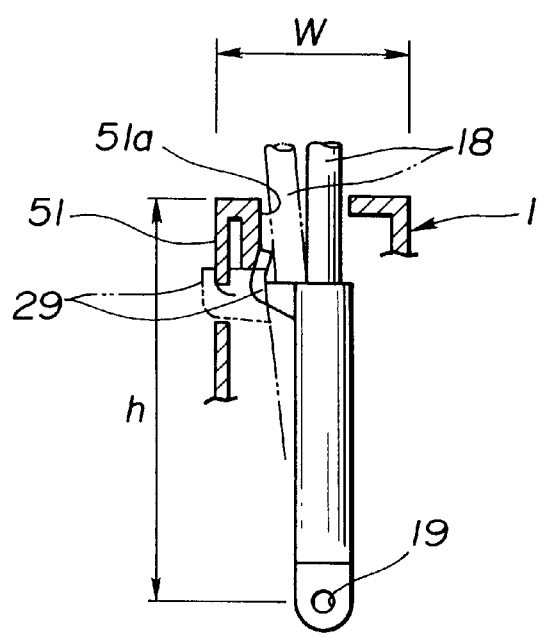

The selector lever 16 is a plate formed into a sector-shape. As shown in FIGS. 1 and 7, a cylindrical shaft 42 supported by the shaft 13 is integrally connected with a swing base of the selector lever 16 by means of welding. A shaft projection 43 for axially connecting a shift-cable or shift-rod is formed at a front end portion of an outer peripheral portion of the selector lever 16. A bracket portion 46 to which a plate spring 44 is fixed by means of a screw 45 is integrally formed with the selector lever 16. A part of the cylindrical shaft 14 of the shift lever base 15 is inserted to the cylinder 42. A pair of bushes 14a are inserted to both end portions of the cylindrical shaft 14. The shaft 13 is inserted into the bushes 14a and 14a, and an end portion of the shaft 13 is screwed with a push nut 13a while passing through the hinge portions 12. The plate spring 44 is slidably in contact with the moderate forming portion 47, such that a moderate resistance is applied to an operator when the shift lever main body 18 is put in the A/T mode shift slot and rotated with the selector lever 16, and such that the selector lever 16 is hold at the D-range position by the sliding force of the plate spring when the shift lever main body 18 is put in the A/T mode shift slot. At a generally center portion of the selector lever 16, openings 48 and 49 of a generally trapezoid are continuously formed.

Figure 5A:
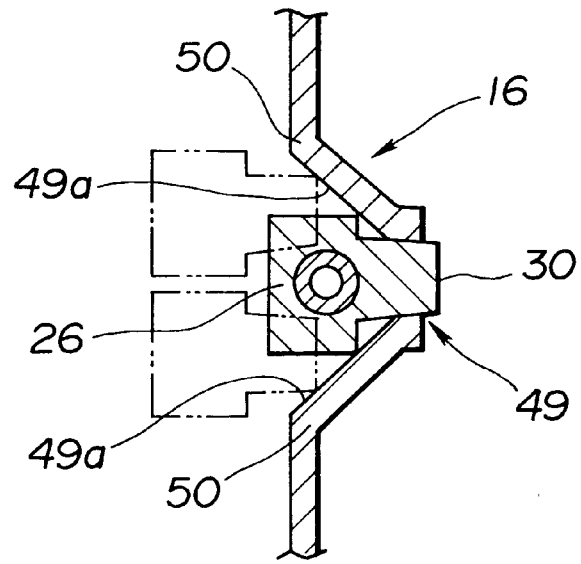
FIGS. 5A and 5B are partial views of a projection guiding portion of a selector lever of the shift lever device of FIG. 1.
Figure 5B:
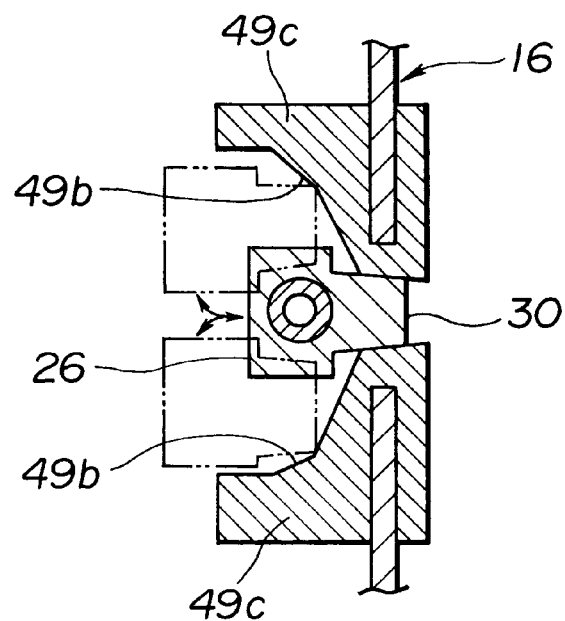

The opening 49 has a pair of guide pieces 50 bent outwards so that the projecting portion 30 of the square column portion 26 is smoothly and firmly connected with and released from the opening 49. More specifically, the guide pieces 50 are bent so that the width between the guide pieces 50 is gradually decreased from the side of the projecting portion 30 to form a guide surface 49a, as shown in FIG. 5A. Of course, such guide surface and projection fitting hole may be formed by installing synthetic-resin guide pieces 49c which has guide surfaces 40b to the opening 49. Therefore, when the shift lever main body 18 is put in the A/T mode shift slot, the projection is inserted to the opening 49 and between the guide pieces 50. When the shift lever main body 18 is rotated so as to be separated from the selector lever 16, the projecting portion 30 is released from the guide pieces 50.

The position pin 27 is projected from both lateral sides of the square column portion 26 of the shift lever main body 18. When the shift lever main body 18 is put in the A/T mode shift slot, an end portion of the position pin 27 is engaged with a detent output portion 54 opening at a side wall portion 51 of the base bracket 11 upon penetrating the opening of the selector lever 16, and the other end portion of the position pin 27 is engaged with another detent cutout portion 54 formed at the other side wall portion 51 of the base bracket 11 to restrict the rotation of the shift lever main body 18. By moving the shift lever main body 18 to the M/T mode shift slot in the D range position, the shift lever main body 18 is swung and the connection between the position pin 27 and the detent cutout portion 54 is canceled.

In this case, the projecting portion 30 is released from the guide pieces 59 of the opening 49. However, one end portion of the position pin 27 is not released from the opening portion 48. Therefore, the position pin 27 is vertically moved into the opening 48 when the operator manipulates the knob button 38. Further, the opening 48 is formed in a sector-shape so that the position pin 27 can moved within the opening 48 in the fore-and-aft direction when the shift lever main body 18 is put in the M/T mode shift slot.

Figure 6A:
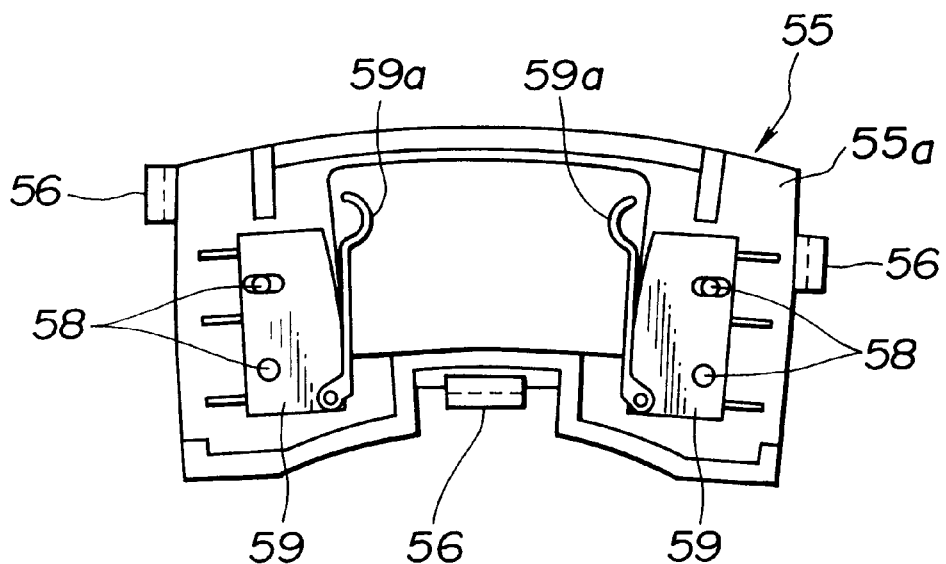
FIGS. 6A and 6B are a backside view and a side view of a limit switch unit of the shift lever device of FIG. 1.
Figure 6B:
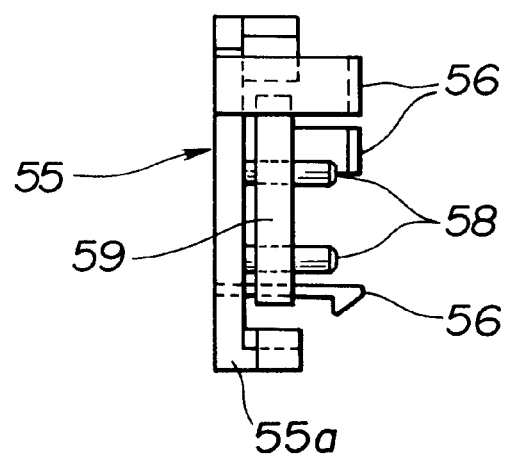

Openings 52 and 53 are integrally formed on the base bracket 11 such that due to the opening 52 the lever portion 29 does not interfered with the side wall portion 52 of the base bracket 11 and due to the opening 53 the lever portion 29 is rotatable in the fore-and-aft direction of the vehicle when the projecting portion 30 is put out from the opening 49, that is, when the shift lever main body 18 is rotated in the left hand side on the shaft 13. Formed on both side wall portions 51 are the detent cutout portions 54. The left hand side one of the detent cutout portions 54 is located under the opening 53. A stopper portion 51a of a thick portion or lib portion is formed at an inner surface of the left side wall portion 51 so that the lever portion 29 becomes in contact with or slides on the stopper portion 51a when the shift lever main body 18 is put in the A/T mode shift slot. A switch unit 55 is installed to the left side wall portion 51 so as to cover the openings 52 and 53. That is, the switch unit 55 is constituted by a sector-shaped housing 55a having three crow projections 56 and first and second limit switches 59 and 59 installed in the sector-shaped housing 55a, as shown in FIGS. 6A and 6B. The three crow projections 56 formed at three sides of the housing 55a are connected to the side wall 51 through connecting holes 57.

The sector-shaped housing 55a has a pair of projections 58 integrally formed at the inner surface thereof. The limit switches 59 are fixedly connected with the housing 55a by fittingly inserting the projections 58 into holes 59b. Each limit switch 59 has each actuator 59a through which turning on and off of each limit switch 59 is executed. That is, when each actuator 59a is in contact with and pushed by the lever portion 29, each limit switch 59A, 59B is turned on. When each actuator 59a is released from the lever portion 29, each limit switch 59A, 59B is turned off. The limit switch 59A disposed at a vehicle front side of the indicator 22 functions as for acceleration, the other limit switch 59B disposed at a vehicle rear side of the indicator 22 functions as for deceleration. Each of the ON-OFF signals of the respective limit switches 59A and 59b is sent to the automatic transmission.

The base bracket 11 is an integrally formed member of synthetic resin. A shift lock mechanism 60 is disposed at a side portion of the base bracket 11, and a rubber boot 64 is connected to a bottom portion of the base bracket 11 through projections 61. The rubber boot 64 functions to sealingly connect the base bracket 11 to a vehicle floor. The base bracket 11 is fixed on the vehicle floor through the rubber boot 64 by means of bolts 63. Further, a seal plate 62 made of steel sheet is installed between the base bracket 11 and the rubber boot 64 to ensure a flat dimension of the base bracket with respect to the vehicle floor. In FIG. 2, reference numeral 65 denotes a limit switch to which a projecting portion 66 of the selector lever 16 is contacted and released to put the shift lock mechanism 60 in operative and inoperative conditions.

Hereinafter, the manner of operation of the above-mentioned automatic transmission operating device will be discussed.

When the vehicle is driven in the A/T mode, first the shift lever main body 18 is stood upright from the base bracket to moved with the selector lever 16 by the connection of the projecting 30 with the opening 49. Then, the position pin 27 is released from the previously set range by lowering the compression rod 34 through the push-operation of the knob button 38, and the shift lever main body 18 is rotated on the shaft 13 along the A/T mode shift slot in the fore-and-aft direction. During this operation, since the selector lever 16 is moved integral with the shift lever main body 18, moderate resistance during shifting is ensured in each shift range by the biasing force of the plate spring 44 slidably contacted with the moderate forming portion 47.

When the shift position is changed from the D range of the A/T mode to the M/T mode, the shift lever main body 18 is pushed down toward a direction separated from the selector lever 16 around the shaft 19. By this lateral swinging movement of the shift lever main body 18, the projecting portion 32 is released from the actuator 25a to turn on the limit switch 25 and to input the switching signal indicative of the change to the M/T mode of the transmission to the control section of the automatic transmission. Simultaneously, the projecting portion 30 is released from the opening 49 of the selector lever 16, and the selector lever 16 is put in a condition that the shift cable or rod 67 is set in the D-range by the sliding force of the plate spring 44 pushing the moderate forming portion 47. Since the ball-head projecting shaft 40 is moved from the groove 41a to the groove 41b of the moderate forming portion 41 during the lateral swing of the shift lever main body 18, the operator feels proper operational resistance.

At this time, if the shift lever main body 18 is positioned so as not to rightly face with the switching slot 23d between the projecting portions 22a and 22a, for example, to be located at a side of the projecting portion 22a, the lever portion 29 is in contact with the stopper portion 51a of the side wall portion 51 of the base bracket 11 even by the lateral swing operation of the shift lever main body 18 to the M/T mode shift groove. Therefore, the shift lever main body 18 never applies load to the projecting portions 22a in such condition.

By moving the shift lever main body 18 from the switching slot 23d between the projecting parts 22a of the indicator 22 to the M/T mode shift slot, the shift lever main body 18 is inclined leftward on the shaft 19, and the stopper lever 19 is projected through the openings 52 and 53 toward the side of the base bracket 11 to be located in the opening 53. In this condition, by swinging the shift lever main body 18 in the fore-and-aft direction on the shaft 13, the lever portion 29 is moved in the opening 53 in the fore-and-aft direction of the vehicle to push the actuators 59a of the limit switches 59 and 59. Therefore, the acceleration signal or deceleration signal is inputted to the control section of the automatic transmission.

If the operator releases the shift lever main body 18, the shift lever main body 18 becomes free, and the ball-head projection shaft 40 slides on the inclined surface 41c and returns to the valley portion 41d. Therefore, as shown in FIG. 10, the shift lever main body 18 is always kept in the neutral position. Since the ball-head projection shaft 40 is position in the groove formed valley-shaped in cross section, the shift lever main body 18 is positioned at a predetermined position in the lateral direction during the movement of the shift lever main body 18. Therefore, the shift lever main body 18 is stablly moved in the fore-and-aft direction without generating play or incoherent. This largely decreases the play during the shift lever operation.

Even if the selector lever 16, which is put in the D-range by the sliding force of the plate spring 44, is moved to the other range because of the vibration of the vehicle or the like, the swinging operation of the shift lever main body 18 in the M/T mode shift slot forces the position pin 27 moved in the opening 48 of the selector lever 18 to become in contact with end surfaces 48a and 48b of the opening 48 to rotate the selector lever 16. Therefore, the selector lever 16 is returned to the position of the D-range.

In order to return the operation mode from the M/T mode to the A/T mode, the shift lever main body 18 is positioned at a generally center position of the opening 53 and is swung laterally in the rightward direction around the shaft 19. With this operation, the lever portion 29 is moved from the opening 52 into the base bracket 11, and the projecting portion 30 is inserted to the opening 49 of the selector lever 16 while being guided by the guide pieces 50 to integrally interconnect the shift lever main body 18 and the selector lever 16. Even if the projecting portion 30 is not properly directed to the opening 49, the projecting portion 30 is guided by the guide surfaces 49b while being in contact with the guide pieces 50. Accordingly, the shift lever main body 18 is swung in the fore-and-aft direction around the shaft 13. Further, the projecting portion 32 of the shift lever main body 18 pushes the operation lever 25a to turn off the limit switch 25. The turned-off signal indicative of the change from the M/T mode to the A/T mode is inputted to the control section of the automatic transmission.

Referring to FIGS. 21 to 29, there is shown a second embodiment of the shift lever device of an automatic transmission according to the present invention.

A shift lever 101 is constituted by a shaft 102, a shift lever main body 103 and a selector lever 104 which are formed by synthetic resin. The shaft 102 is supported to a base bracket 150 fixed to a floor of the vehicle so as to be rotatable on the axis along the lateral direction of the vehicle. The shift lever main body 103 is supported to the shaft 102 so as to be swingable in the lateral direction of the vehicle. The selector lever 104 is supported to the shaft 102 so as to be swingable in the fore-and-aft direction of the vehicle. A compression rod 105 formed by an upper rod 105a and a lower rod 105b are inserted into the shift lever main body 103.

Figure 21:
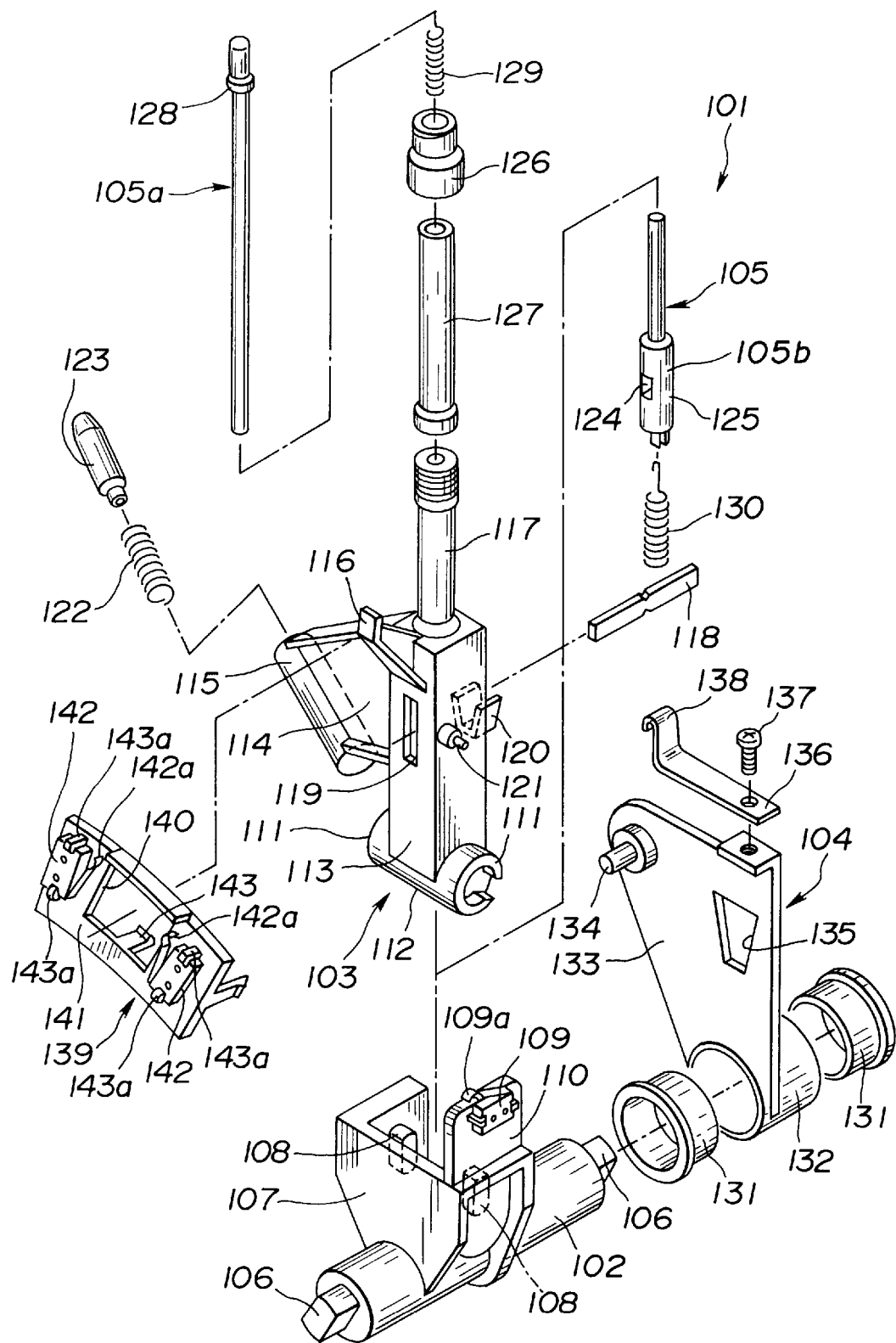
FIG. 21 is an exploded perspective view of a second embodiment of the shift lever device according to the present invention.

A pair of axial portions 106 formed into an oblong cross section are integrally connected to the end portions of the shaft 102. A box-shaped shaft-receiving portion 107 is integrally connected to the shaft 102. The box-shaped shaft-receiving portion 107 has a pair of axial portions 108, 108 by which a pair of C-shaped shaft-receiving portions 111, 111 of a cylindrical shaft 112 are rotatably supported. A side wall portion 110 for installing a limit switch 109 is connected to the box-shaped shaft-receiving portion 107. A square column portion 113 is integrally formed with the cylindrical shaft 112 and is integral with a projecting portion 114 to which a cylindrical portion 115 is inclinedly and integrally connected. A lever portion 116 is integrally connected to a side adjacent to the side of the projecting portion 114, as shown in FIG. 21. A lower pipe 117 for inserting the compression rod 5 is integrally formed with the square column portion 113 so as to extend upward from a top end of the square column portion 113. Under the lever portion 116, a slot 119 is formed to penetrate the square column portion 113. An opposite side of the side having the lever portion 116 has a generally V-shaped projection 120 located under the slot 119. A side opposite to the side including the cylindrical portion 115 has a connecting projection 121. A coil spring 122 is inserted to the cylindrical portion 115, and a sliding member 123 is inserted to the cylindrical portion 115 and is biased by the coil spring 122 so as to projectingly push the base bracket 150. An end portion of the sliding member 123 is formed into a ball-shaped head.

The lower rod 105b of the compression rod 105 has a large diameter portion to which a slot 124 for inserting a position pin 118 is formed. The upper rod 105a of the compression rod 105 is inserted to an upper pipe 127 which is interconnected with the lower pipe 117 through a coupler 126. A head cover 128 is integrally formed at a top end of the upper pipe 127 and is biased by a coil spring 129 which is installed in the upper pipe 127 and is inserted to the upper rod 105a. The compression rod 105 is arranged to be lowered according the pushing of a push button 164 of a knob 163. A coil spring 130 is installed between the position pin 118 and an end of the hole in the square column portion 113 so as to push the compression rod 105 upwardly.

The selector layer 104 is constituted by a cylinder portion 132 and a sector-shaped plate portion 133 integral with the cylinder portion 132. The cylinder portion 132 is rotatably connected to the shaft 102 through a pair of bushes 131, 131. A connection pin 134 for connecting a shift cable or rod is installed to the plate portion 133. A sector-shaped opening 135 is formed at the plate portion 133 so that the projecting portion 120 is engaged with the opening 135 and the position pin 118 penetrates the opening 135. An elastic plate 136 is connected to an upper end portion of the plate portion 133 through a screw 137. A free end portion 138 of the elastic plate 136 is bent and formed into an arc shape.

A switch unit 139 is installed to the left side wall of the base bracket 150. The switch unit 139 is constituted by a unit bracket 141 having three crow projections 56, and first and second limit switches 143 and 143. The three crow portions 143 are connected to the side wall of the base bracket 150.

The unit bracket 141 has two pair of projections 143a integrally formed at the inner surface thereof. The limit switches 143 are fixedly connected with the base bracket 141 by means of the projections 143a. Each limit switch 142 has each actuator 142a through which turning on and off of each limit switch 142 is executed. That is, when each operation lever 142a is in contact with and pushed by the lever portion 116, each limit switch 142 is turned on. When each actuator 142a is released from the stopper lever 116, each limit switch 142 is turned off. The limit switch 142 disposed at a vehicle front side of the indicator 22 functions as for acceleration, the other limit switch 142 disposed at a vehicle rear side of the indicator 160 functions as for deceleration. Each of the on-off signals of the respective limit switches 142 is sent to the automatic transmission.

Figure 22:
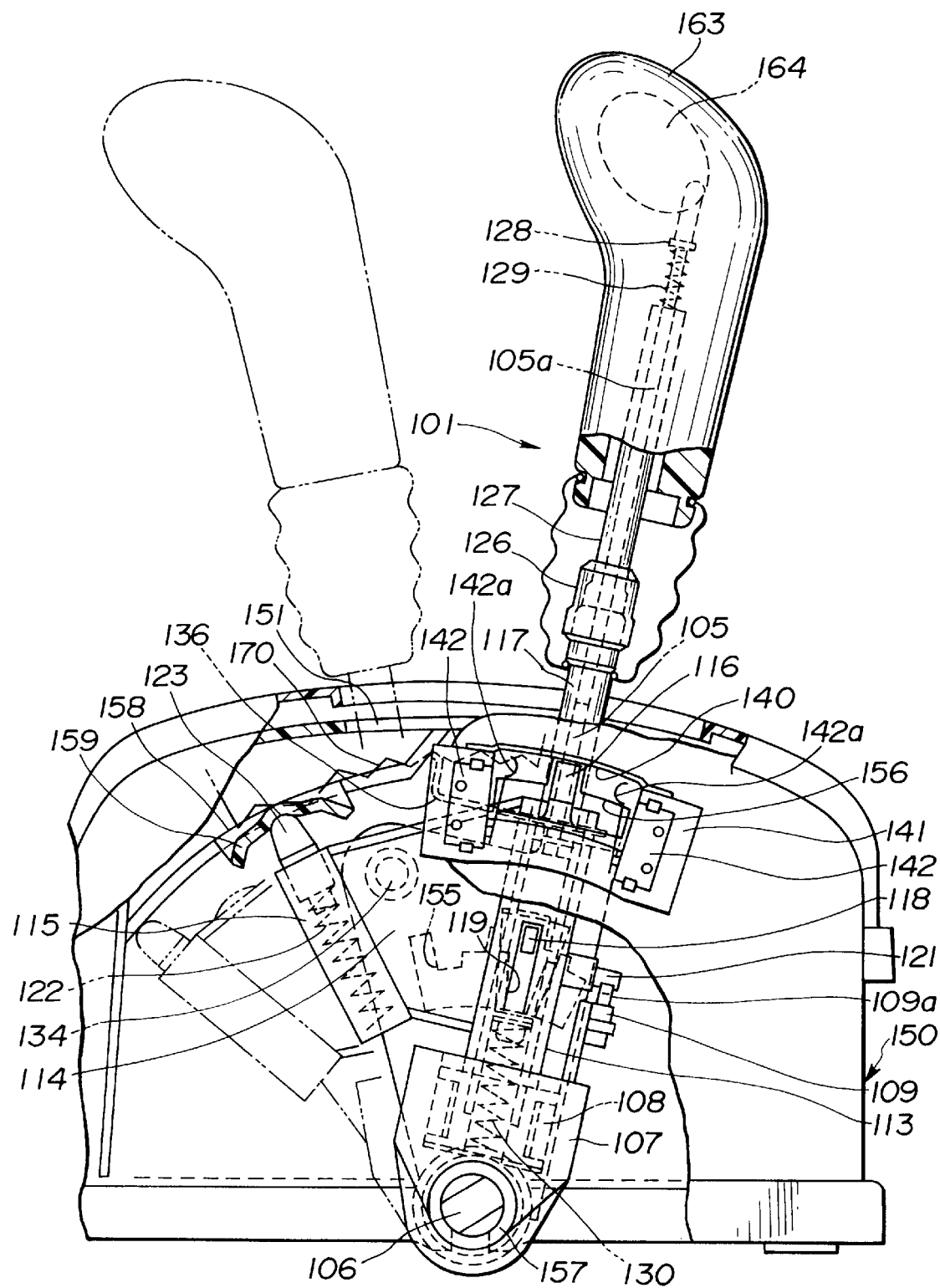
FIG. 22 a side view of the shift lever device of FIG. 21.
Figure 23:
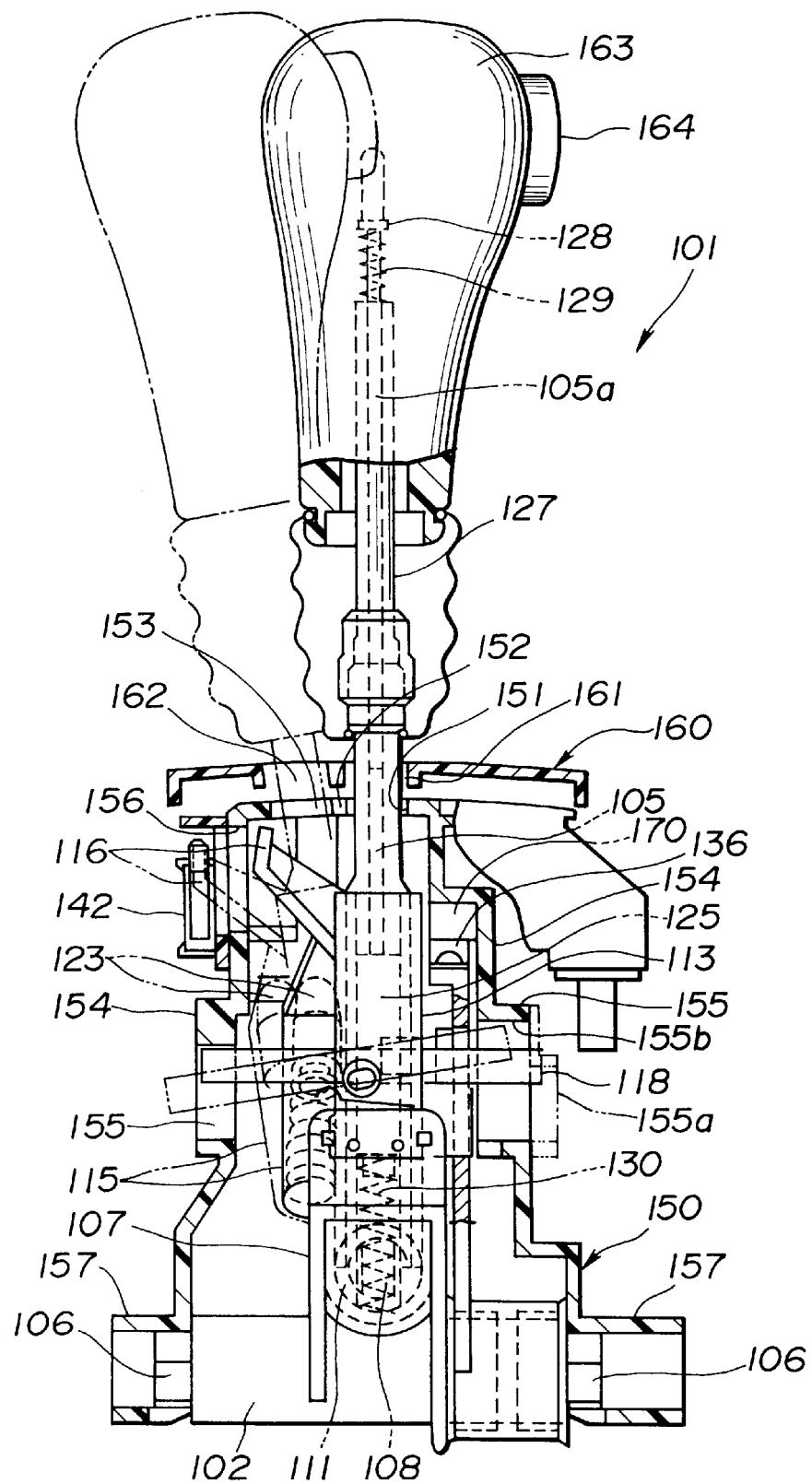
FIG. 23 is a rear view, partly in cross section, of the shift lever device of FIG. 22.
Figure 24:
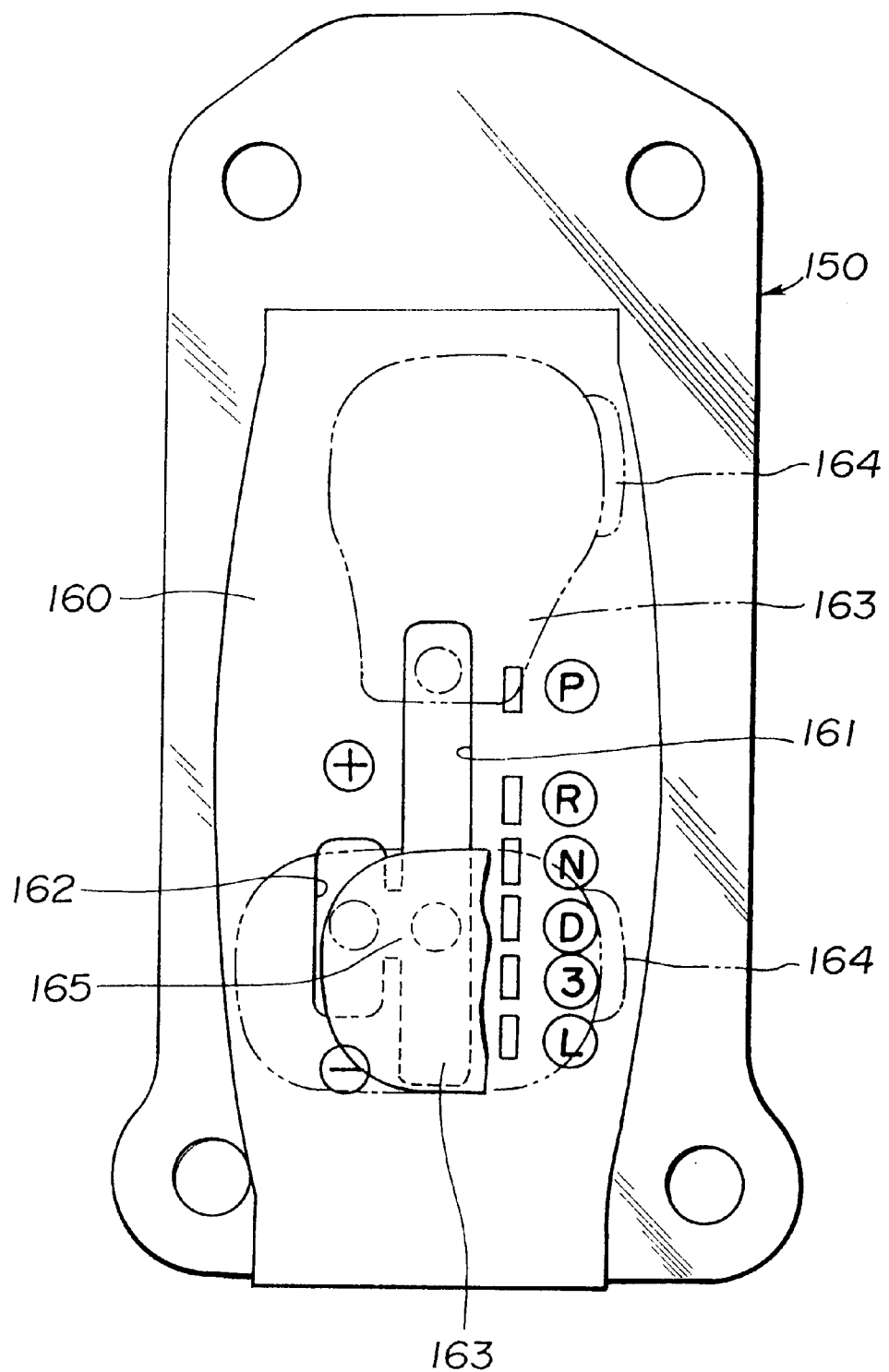
FIG. 24 is a plan view, partly in cross section, of the shift lever device of FIG. 22.
Figure 25:
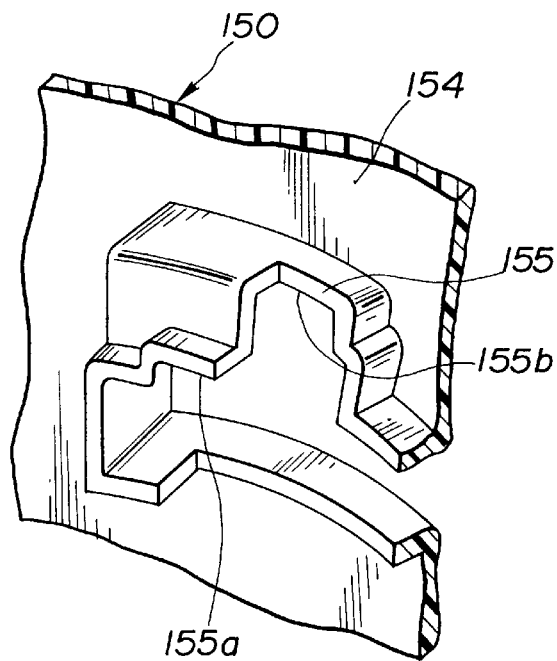
FIG. 25 is a partial view of a detent cutout portion of a base bracket of the shift lever device of FIG. 21.

As shown in FIGS. 22 to 24, the base bracket 150 is formed to have an A/T mode shift slot 151 for swinging the shift lever 101 in the fore-and-aft direction, a moving (switching) slot 152 for laterally swinging the shift lever 101 and the M/T mode shift slot 153 at its upper surface between the side walls 154, 154. A detent cutout portions 155 are respectively formed at the side wall portion 154, 154. An opening 156 to which the lever portion 116 is inserted is formed upward of the detent cutout portion 155 at the M/T mode shift slot 153. An indicator 160 is fixedly installed on the upper surface between the side walls 151 and 151 of the base bracket 150.

Figure 28:
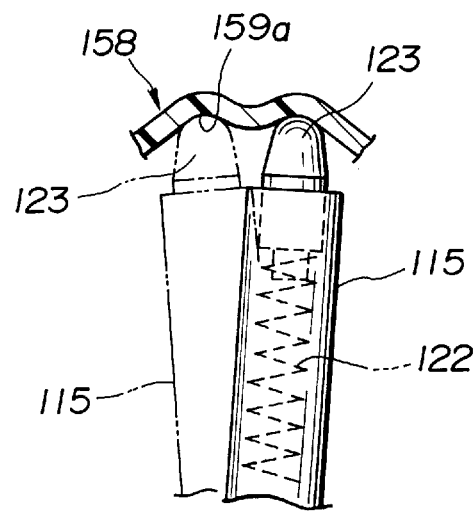
FIG. 28 is a view for explaining an operation of the moderate limit forming portion during a switching of a gear shift mode into a manual gear shift mode.

The base bracket 150 has a pair of shaft receiving portions 157, 157 for receiving the shaft 102 at its lower portion. As shown in FIG. 24, the detent cutout portion 155 of the base bracket 150 has a first step portion 155a at which the position pin 118 is received when the shift lever 101 is put in the A/T mode and a second step portion 155b at which the position pin is received when the shift lever 101 is put in the M/T mode. The first step portion 155a is offset from the second step portion 155b as shown in FIG. 28. That is, since the step for preventing the detaching of the position pin 18 is formed between the D-range shift position and the one down-shift position in the A/T mode, it becomes necessary to operate the push button 164 of the knob 163 so that the operation of the shift lever in the M/T mode becomes impossible. Therefore, this structure is arranged so that the position pin 118 does not interfere with the detent cutout portion 155.

If the shifting operation from the D-range to the one down-shift position can be executed without the depression of the push button 164 of the knob 163, it is not necessary to install the step 155a at the detent cutout portion 155. The second step 155b of the detent cutout portion 155 is formed higher in height level than the step of the detent cutout formed at the outer side wall 154.

The indicator portion 160 has an A/T mode shift slot 161 and a M/T mode shift slot 162 which are arranged parallel and are interconnected through a switching slot 165 formed adjacent to the D-range position. Marks indicative of the shift position and lumps are arranged adjacent to the A/T mode shift slot 161 on the indicator 160. Further, a plus mark (+) and a minus mark (−) are indicated adjacent to the M/T mode shift slot 162 on the indicator 160.

Figure 26:
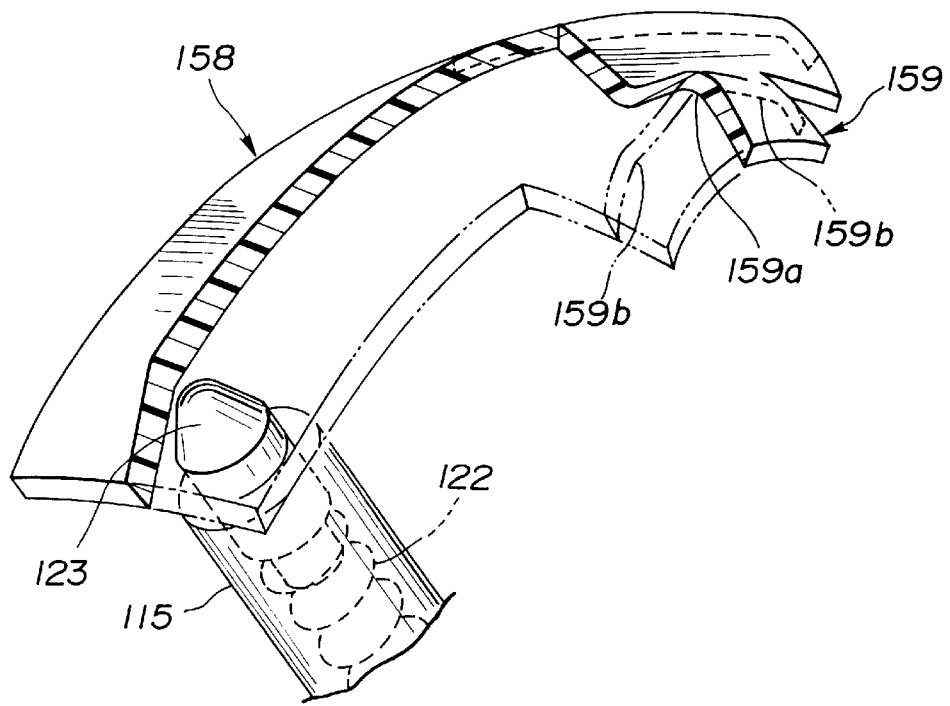
FIG. 26 is a perspective view, partly in cross section, of a moderate limiting forming portion and a neutral limiting portion formed integrally on the base bracket of FIG. 21.
Figure 27:
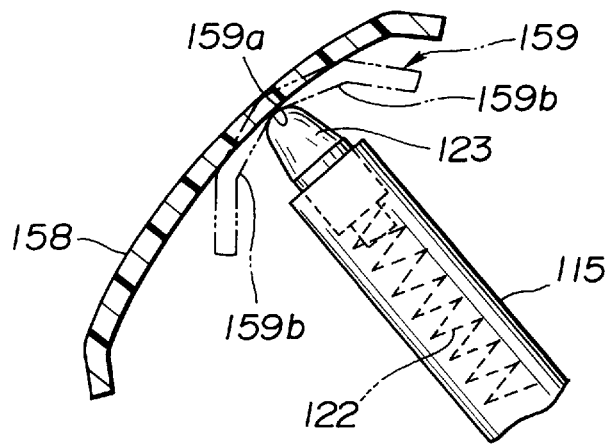
FIG. 27 is a cross-sectional side view of the neutral limiting forming portion of FIG. 26.

The ball-head portion of the sliding member 123 is in contact with the slide portion 158 formed by a circular arc surface. As shown in FIG. 26, the neutral limiting portion 159 is integrally formed at a side portion of the D range position with the slide portion 158 of the base bracket 150. The neutral limiting portion 159 has a valley portion 159 at its center position, and the valley portion 159a is defined by oblique surfaces 159b and 159b extending in the fore-and-aft direction. Further, a moderate forming portion 70 including top portions and valley portions is integrally formed with the base bracket 150. The arc-shaped portion 138 of the elastic member 136 connected to the selector lever 104 is set to be slid on the moderate forming portion 170.

The manner of operation of the shift lever device of the second embodiment according to the present invention will be discussed.

In the A/T mode operation, by swinging the shift lever 101 on the shaft 102 and along the shift slots 151 and 161 in the fore-and-aft direction of the vehicle, the selector lever 104 engaged with the projecting portion 120 of the shift lever 101 is integrally swung with the shift lever 101 so as to control the shift cable or rod interconnected with the selector lever 104. The sliding member 123 functions to suppress the play in the lateral direction of the sliding portion 158 with respect to the circular arc portion. Further, the elastic member 136 connected to the selector lever 104 is moved between the mount portion and the valley portion of the proper resistance generating portion 170 according to the swing of the selector lever 104 so as to generate proper resistance in the shift lever operation.

For example, in a P (parking) range, by pushing the push button 164 of the knob 163, the compression rod 105 is lowered against the biasing force of the coil springs 129 and 130 to lower the position pin 118 along the slot 119. This enables the position pin 118 to be released from the step of the detent cutout portion 155 and the shift lever 101 to be rotated. When the press button 164 is released, the compression rod 105 is drawn in the upper direction by means of the coil spring 130 and the compression rod 105a is drawn in the upper direction by means of the coil spring 129, respectively. Accordingly, the position pin 118 is also moved in the upper direction of the elongated hole 119. With this operation, the position pin 118 becomes in contact with the upper surface of the detent cutout portion 155. At this time, both end portions of the position pin 18 are in contact with step side surfaces of the detent cutout portions 55 and 55 if the shift lever 101 is rotated.

On the other hand, in order to select the manual gear (M/T) shift mode, the knob 163 is used to make the shift lever 101 move at the D range (as shown in FIG. 23) and the knob 163 is tilted in the lateral direction. At this time, the shift lever 101 is pivoted on a journal portion 111 of the shift lever 101 as a center, and a projecting portion 120 projected from the shift lever 101 is released from the opening 135 of the selector lever 104 so as to be independently swingable in the fore-and-aft direction. Further, the actuator 109a of the limit switch 109 is pressed by means of the projecting portion 121 so that the ON-and-OFF state of the limit switch 109 is changed to indicate that the shift lever 101 is moved to the A/T mode. The lever portion 116 is projected externally from the side wall portion 154 from the window hole 156, 140 so as to face with the limit switches 142 and 142 fixed onto the side wall protein 154 via the unit bracket 141.

At this time, since an upper surface 155b of the detent cutout portion 155 of the right side wall 154 is formed at a position higher than that of the left side wall, it is made possible to carry out the switching between the automatic gear shift mode and the manual gear shift mode and carry out the manual gear shift mode.

As shown in FIG. 28, the sliding member 123 is moved form the D range position of the sliding portion 158 to a center portion of the neutral limiting portion 159 while keeping a moderate resistance, and the shift lever 101 is kept at the neutral position of the M/T mode.

Then, if the knob 160 is moved to the front side of the base bracket 150, the shift lever 101 is pivoted on the shaft 102. When the lever portion 116 is contacted with the actuator 142a so that the limit switch 142 located at the acceleration (+) side is turned ON to shift up the gear shift range. On the contrary, the limit switch 142 located at the minus side (−) is turned ON to reduce the gear shift range. At this time, although the position pin 118 passing through the opening 135 of the selector lever 104 is rotated, it is not in contact with the periphery of the opening 135, and the selector lever 104 is held at a predetermined position by means of the elastic member 36 contacted with the moderate forming portion 170. Further, since the detent cutout portion located at an end portion of the position pin 118 is formed to be offset and the end portion of the position pin 118 is moved due to the rotation, the position pin 118 is freely rotated without interfered with the detent cutout portions 55.

Figure 29:
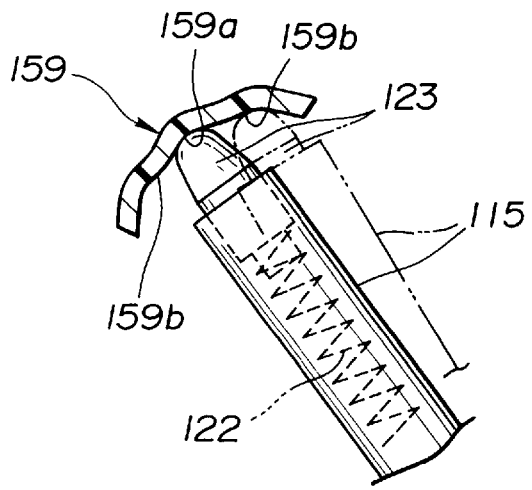
FIG. 29 is a view for explaining an operation of the natural limit forming portion during the manual gear shift position.

As shown in FIG. 29, the slide member 123 is moved from the center position of the neutral limiting portion 159 to the oblique surface portion 159b so as to compress the coil spring 122. When the knob 164 is released from the drivers' fingers, the biasing force of the coil spring 122 returns the slide member 123 to the center portion (valley 159a) of the neutral limiting portion 159, and the neutral portion of the shift lever upper body 101 is held.

In order to return the shift lever 101 from the manual gear shift mode to the automatic gear shift mode, the knob 164 is pivoted so that the shift lever 101 is returned to the original state. At this time, the lever portion 116 is moved from the openings 156 and 140 to the inside of the side wall portion 154 so that the limit switch 109 is turned to ON or OFF. Then, if the knob 160 is moved in the fore-and-aft direction, the shift lever upper body 101 is pivoted in the fore-and-aft direction so that the normal automatic gear shift mode can be operated.

Referring to FIGS. 30 to 40, there is shown a third embodiment of the shift-position select lever device according to the present invention.

Figure 30:
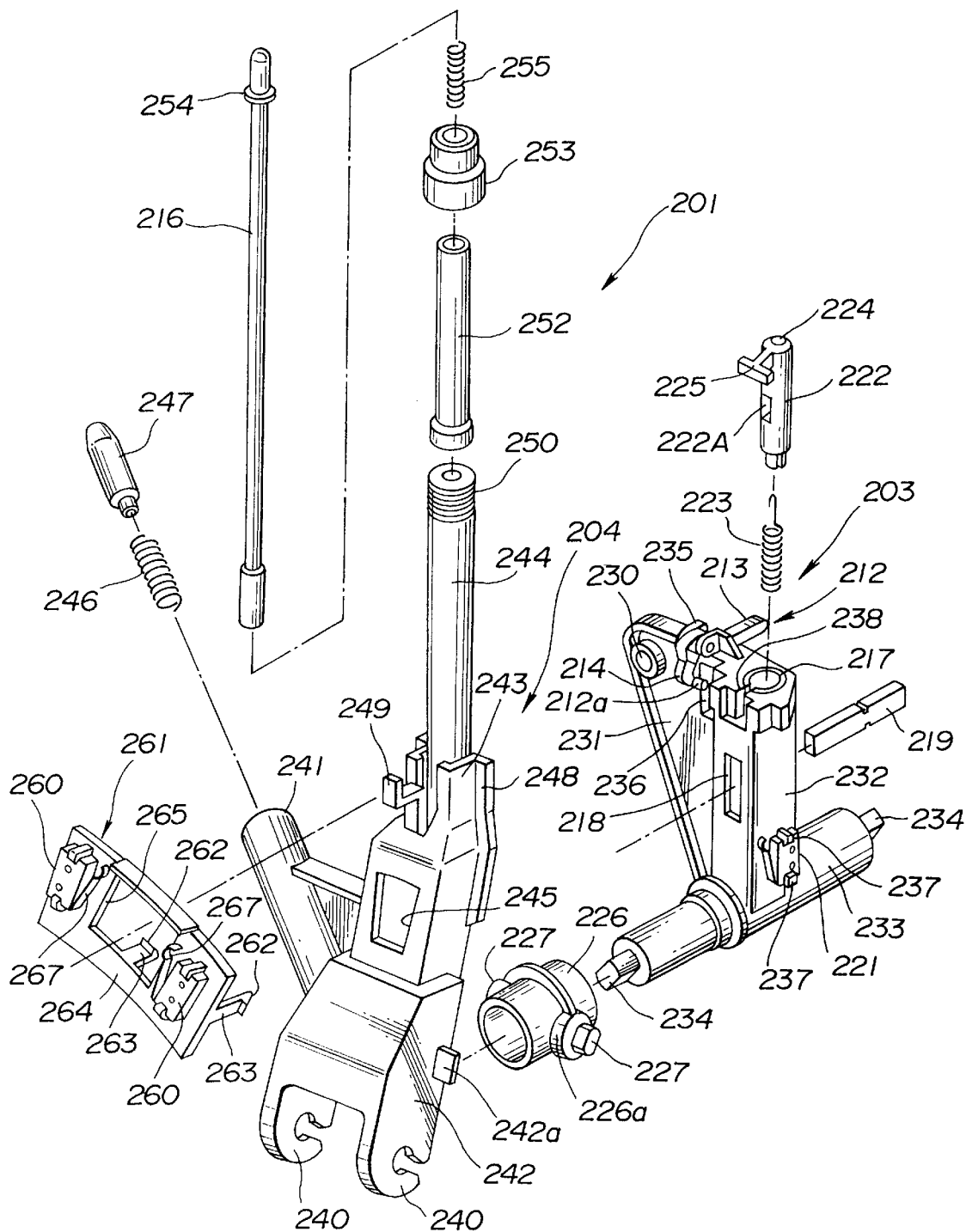
FIG. 30 is an exploded perspective view of a third embodiment of the shift lever device according to the present invention.
Figure 33:
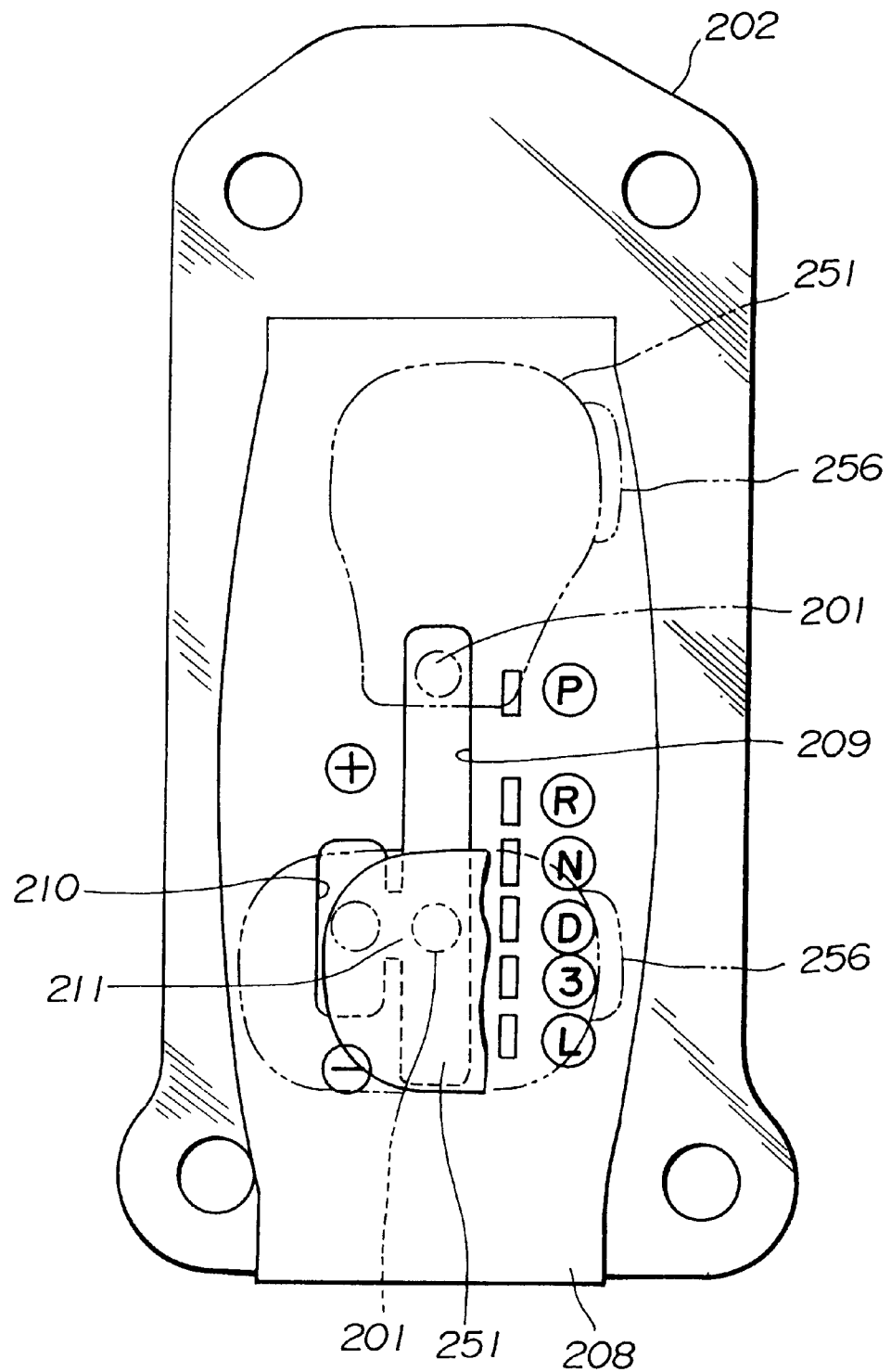
FIG. 33 is a plan view, partly in cross section, of the shift lever device of FIG. 32.

As shown in FIGS. 30 and 33, a shift lever 201 includes a shift lever lower body 203 pivotally supported by a case bracket 202 at its axial support (a first axial support) and a shift lever upper body 204 axially supported on the shift lever lower body 203 (via a second axial support as will be described later) so as to be enabled to be pivoted in lateral direction and longitudinal directions of the base bracket 202. The longitudinal direction corresponds to the fore-and-aft direction with respect to a vehicle running direction.

Figure 32:
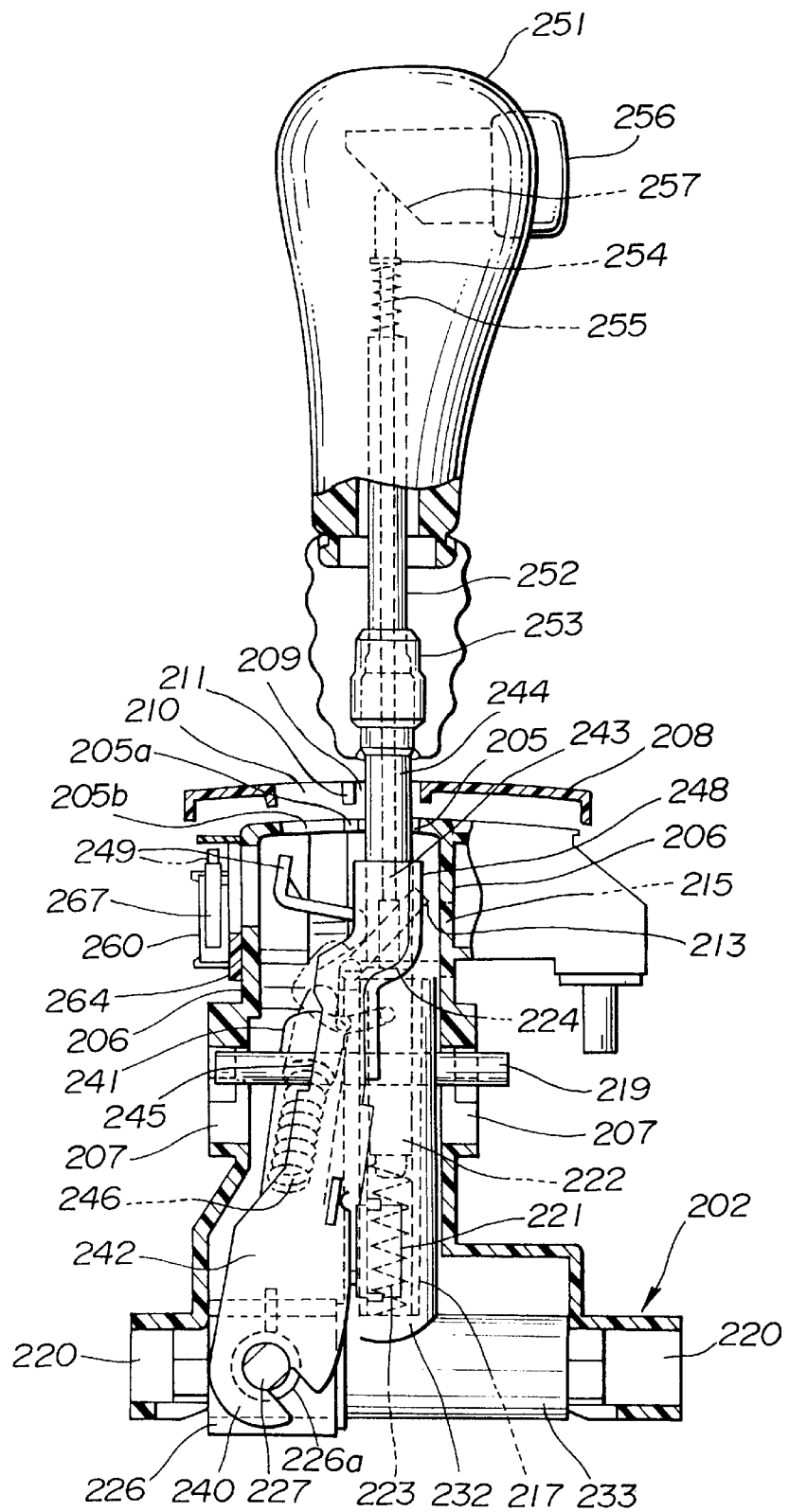
FIG. 32 is a rear view, partly in cross section, of the shift lever device of FIG. 31.

The base bracket 202 is formed integrally of a synthetic resin. The shift lever 201 is dived into tow, i.e., the shift lever upper body 204 and the shift lever lower body 203. These upper and lower bodies 203 and 204 are formed of the synthetic resin. As shown in FIG. 32, the base bracket 202 is formed with a shift slot 205 to pivot the shift lever 201 in the longitudinal direction, a movement slot 205a to pivot the shift lever in the lateral direction, and a manual gear mode shift slot 250b. These slots 205, 205a and 205b are formed on an upper surface of the base bracket 202 connecting both side wall portions 206 and 206 to form a position gate on the base bracket 202. Detent cutout portions 207 and 207 are formed on the side wall portions 206 and 206, respectively. An indicator 208 is fixed on the upper surface of the side wall portions 206 and 206.

As shown in FIG. 33, the indicator 208 is provided with an automatic gear shift slot 209 and a manual gear shift slot 210 which are arranged parallel. Another slot 211 for switching the position of the shift lever 201 is linked to the shift-slots 209 and 210. These slots 209, 210 and 211 correspond to the automatic mode shift slot 205, the movement (switching) slot 205a, and the manual gear shift slot 205b, respectively, and formed approximately in H-shape. Marks for representing gear shift ranges and lamps indicating the gear shift ranges (P, R, N, D, 3 and L) are installed on the indicator 208 and symbols of + and − are represented on a front side and rear side of the shift hole 210.

Figure 34:
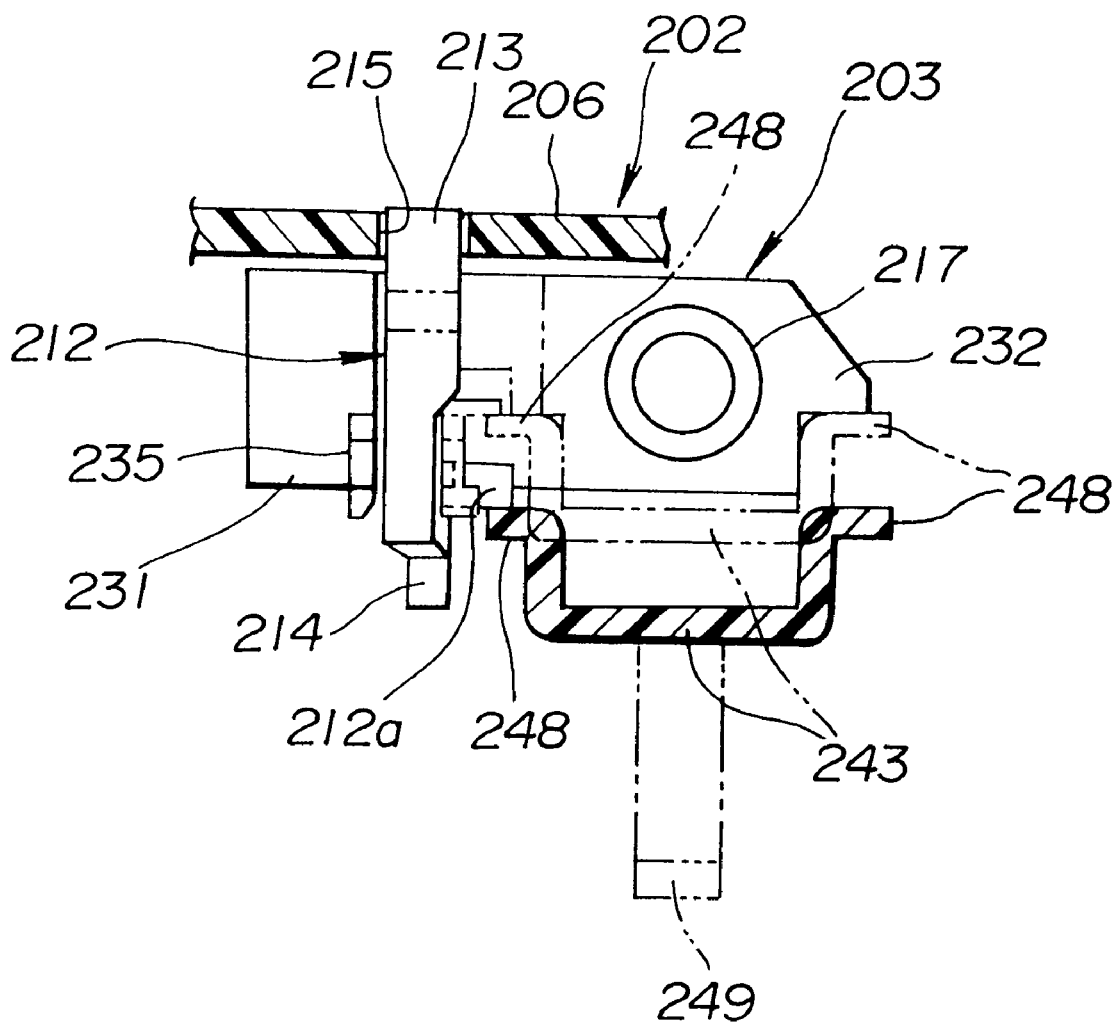
FIG. 34 is a plan view, partly in cross section, of an assembly of a shift lever upper body and a shift lever lower body of the shift lever device according to the present invention.
Figure 35A:
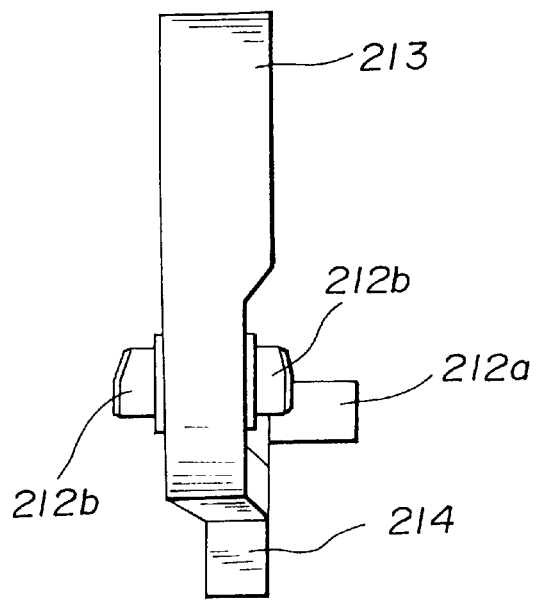
FIGS. 35A, 35B and 35C are a front view, a plan view and a side view of a lock member assembled in the lever lower body shown in FIG. 30.
Figure 35B:
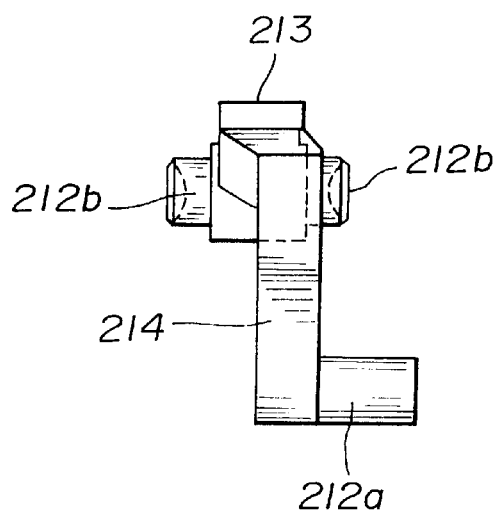
Figure 35C:
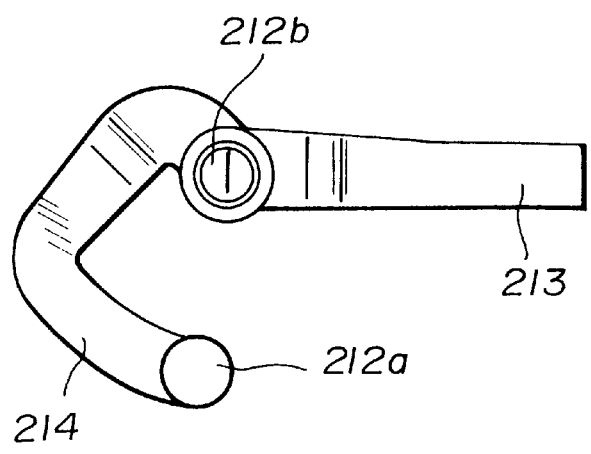

The shift lever lower body 203 includes a main body 232 and a shaft body 233 integrally formed on the main body 232. The main body 232 is provided with a penetrating hole 230 through which a shaft (not shown) to link a gear shifting cable or rod is inserted and an approximately triangular plate 231 having the penetrating hole 230 is projected toward a front side of the base bracket 202. The shaft body 233 is projected by a predetermined length in an oval shape of cross section. The oval shaped cross sectional portion 234 is fitted to a C-shaped axial support 220 (first axial support) opened in the downward direction of the base bracket 202. As shown in FIG. 34, the shift lever lower body 203 is detachablly engaged to the shift lever upper body 204.

Figure 36:
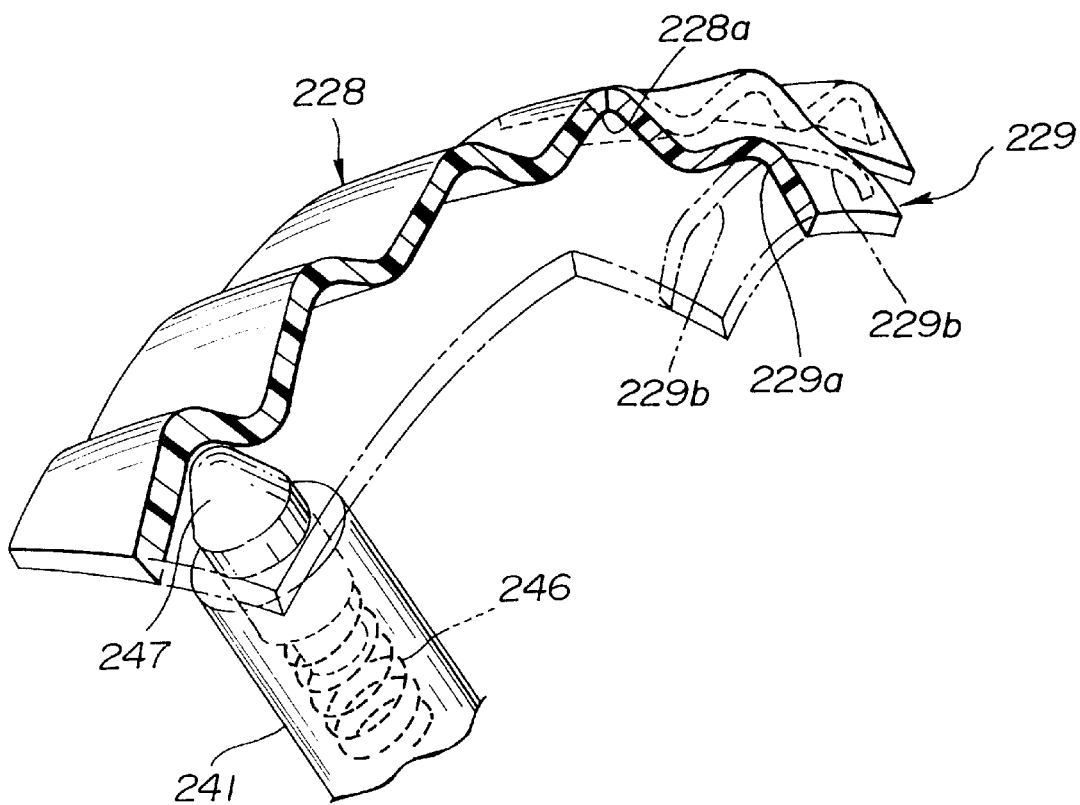
FIG. 36 is a perspective view, partly in cross section, of a moderate limiting forming portion and a neutral limiting portion formed integrally on the base bracket.
Figure 37:
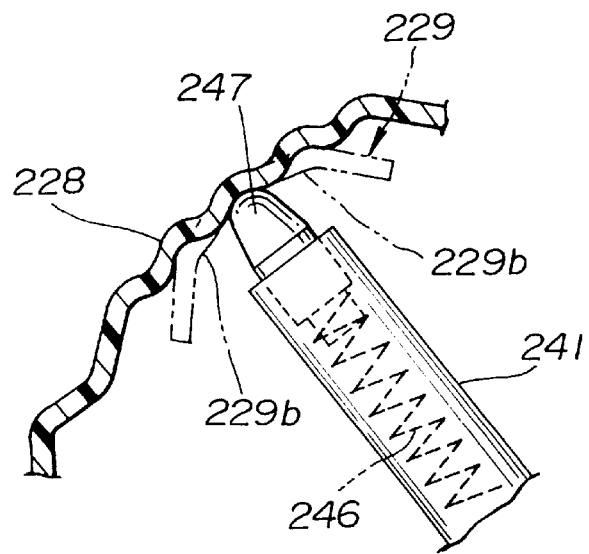
FIG. 37 is a cross-sectional view of the neutral limiting forming portion of FIG. 36.

FIG. 36 shows a partially broken cross sectional view of a moderate limit forming portion and a neutral limit forming portion. FIG. 37 shows a partially broken cross sectional view of the moderate limit forming portion.

As shown in FIGS. 30, 35A, 35B and 35C, an axial support 235 is integrally formed on an upper part of the plate 231. A lock member 212 supported pivotally on the axial support 235 of the plate 231 is disposed orthogonal to the axial support 235. The lock member 212 includes a straight lined lever 213 projected in a side direction of the plate 231 and an approximately C shaped swing portion 214 extended integrally from the lever portion 213. A roller portion 212a is extended in a side direction so as to be enabled to be contacted with a flange portion 248 of the shift lever upper body 204 and an axle 212b is integrally formed on an intermediate portion thereof. The axle 212b is engaged to the axial support 235 from its side direction. The weight of the lever 203 is heavier than the swing portion 214. The roller 212a can be entered through a hole 236 (refer to FIG. 30) formed on the plate 231. The lock member 212 is pivoted due to its own weight when the shift lever upper body 204 is separated (disengaged) from the shift lever lower body 203. As shown in FIG. 34, the lock member 12 is entered through an engagement hole 215 located at a D range position of the manual gear shaft slot 205 and opened through an engagement slot 215 located at a D range position of the manual gear shift slot 205 and opened through the side wall portion 206 of the base bracket 202 so that the shift lever lower body 203 is lockably fixed onto the base bracket 202. It is noted that although the lock member 212 is pivoted due to its own weight, a spring may be provided on the lock member 212 so as to bias the lock member 212 toward a direction at which the engagement hole 215 is present.

The main body 232 of the shift lever lower body 203, as typically shown in FIGS. 30 and 34, is provided with a lower pipe 217 buried thereinto. The main body 232 has an upper cross section thereof in an approximately C-shape, and in an elongated direction of which, a compression rod is inserted. An elongated hole 218 is opened along the lower pipe 217 (having a hole) at both side surfaces of the main body 232. A position pin 219, as shown in FIG. 30, is engaged with the respective side surfaces of the main body 232 and is penetrated through the elongated hole 218 orthogonal to a lower rod 222 inserted into the lower pipe 217 of the shift lever lower body 203. In addition, one-touch type grasping portions 237 for a second limit switch 221 are integrally formed in a vicinity to a lower end of the main body 232. The position pin 219 is formed finally in a cross shape penetrating a pin insertion hole 222A of the lower rod 222 to be inserted into the lower pipe 17.

The lower rod 222 is biased in the upward direction by means of a compressive coil spring 223 inserted into the lower pipe 217. As shown in FIG. 30, a flat receiving surface 224 is formed on an upper end of the lower rod 222 at which a lower end of the compression rod 216 is contacted. A slidably contacted portion 225 is integrally formed on the receiving surface 224 and is formed in an approximately T shape extending toward the side direction thereof. A side surface of an upper part of the main body 232 of the shift lever lower body 203 is provided with a cutout portion 238 in a slit form so that the slidably contacted portion 225 is moved in the vertical direction with respect to the lower rod 222. The cutout portion 238 is provided with a width enabling the lower end of the compression rod 216 to be passed therethrough.

As shown in FIG. 30, a collar 226 is inserted tightly into one shaft body 233 of the shift lever lower body 203. Axles 226a are integrally formed on the collar 226 so as to face with each other in a diameter direction of the collar 226, and axles 227 and 227 having oval shaped cross sections are formed on tip ends of the axles 226a. Hook-shaped cross sections are formed on tip ends of the axles 226a. Hook-shaped journals 240 and 240 are formed on lower ends of the shift lever upper body 204 so as to engage with the axles 227 and 227 through the orthogonal direction thereto. A fitting portion 243 having a C-shaped cross section is formed under an insert mold with a base portion 242. A cylindrical portion 241 is shaped on the base portion and is projected obliquely from a side wall of the shift lever upper body 204. An upper pipe 244 is fixed to an upper end of the fitting portion 243 through which the compression rod 216 is inserted. A window pane shaped hole 245 is opened in an approximately inverted trapezoid shape through which the position pin 219 is inserted with a play. A coil spring 246 is inserted into the cylindrical portion 241 and a slide member 47 is inserted in to the cylindrical portion 41 which is biased in a projection direction by means of the coil spring 46.

As typically shown in FIG. 30, an upper end of the fitting portion 243 is fitted to an upper part of the main body 232 of the shift lever lower body 203 and is integrally formed with a flange portion 248 (refer to FIG. 31) contactable with a step portion of the main body 232. A projection portion 249 is integrally formed on a side surface of the fitting portion 243 so as to face against the flange portion 248. The flange portion 248 can be contacted with the roller portion 212a of the lock member 212. If the flange portion 238 passes the roller portion 212a, the lock member 212 is pivoted to a lock release position at which the lock member 212 does not engage to the engagement hole 215 of the side wall portion 206 and if the pressure is released, the lock member 212 is pivoted so that the lock member 212 is engaged to the engagement hole 215 of the side wall portion 206.

The compression rod 216 is inserted into the upper pipe 244 via the pipe 252 projected from the knob 251 and having a screwed portion 251 at an upper end of the upper pipe 244. The upper pipe 244 is linked to the pipe 252 via a collar 253, as typically shown in FIG. 30. A collar portion 254 is integrally formed on the upper end of the compression rod 216 so that a compressive coil spring 255 is interposed between the collar 254 and the upper end of the pipe 252. An upper end of the compression rod 216 is formed in a spherical surface and is contacted with an oblique surface 257 of a press button 256, as shown in FIG. 32.

The press button 256 is biased to be projected toward an external direction with respect to the knob 251. A lower end of the compression rod 216 which is inserted into the upper pipe 244 is contacted against the receiving surface 224 of the lower rod 222 and the slidably contacted portion 225.

Figure 31:
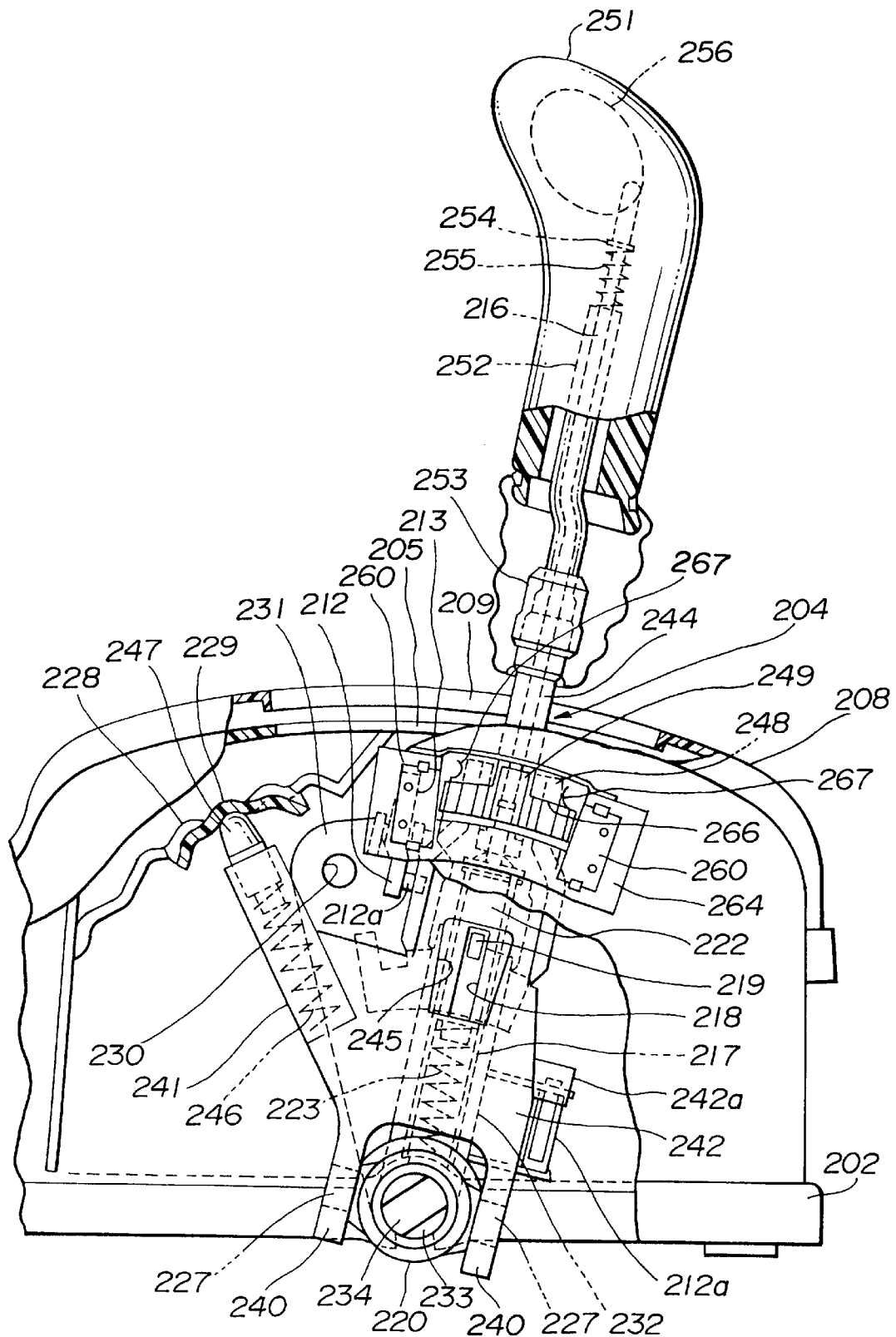
FIG. 31 is a side view of the shift lever device of FIG. 30.

The slide member 247 is contacted with a moderate limit forming portion 228. The slide member 247 has a tip portion formed in a spherical surface shape. The moderate limit forming portion 228 has convex and recess formed portion formed on an inner surface of an upper part of the base bracket 202, as shown in FIG. 31.

As typically shown in FIG. 36, the moderate limit forming portion 228 is formed integrally with a neutral limit portion 229 at a side of a valley portion 228a of the D (Drive) range position. The neutral limit portion 229 has the valley portion 229a at its center position at the D range. An oblique surface 229b is formed in the fore-and-aft direction of the base bracket 202 between the valley portions 29a.

It is noted that a pair of first limit switches 260 are attached between both left and right ends on the side wall 216 located at an upper limit of the detent cutout portion 207 of the base bracket 202 with a position at which the upper pipe 244 is moved to the D range position of the detent cutout portion 207 as a center. These first limit switches 260 are fixed as limit switch units to a unit bracket 264. Three projections 263 having hooks 262 respectively are projected from the unit bracket 264 so that each hook 262 is engaged in each hole located on a peripheral side of a window hole 266. Another limit switch 221 is fixed to the shift lever lower body 203. These first switches 260 and 260 have first and second actuators 267 and 267 which are actuated in response to the actuators by the projection 249.

The unit bracket 264 is fixed onto an outside surface on the side wall portion 206 as shown in FIG. 32. The unit bracket 264 is arranged such that the limit switches 260 and 260 are appropriately spaced apart from each other and between which a cutout portion 265 is formed. The cutout portion 265 is coincident with a window hole 266 (refer to FIG. 31). Thus, the projection portion 249 can be contacted with an actuator 267 of the limit switch 260. In addition, when the projection portion 249 is placed at a position contactable with an actuator 267, a side surface of the fitting portion 243 of the shift lever upper body 204 is actuated as a stopper slidably contacting on an inner surface of the side wall portion 206.

When the projection portion 249 presses the actuator 267 of the limit switch 260 on a front side of the vehicle body to be turned ON, the gear shift range is shifted up at one stage (+). Conversely, if the actuator 207 of the limit switch 260 located at the rear side of the vehicle body is turned to ON, the gear shift range is shifted down at one stage (−). Thus, the manual shift mode can be achieved.

Next, an operation of the embodiment of the shift lever discussed according to the present invention will be discussed.

Figure 38:
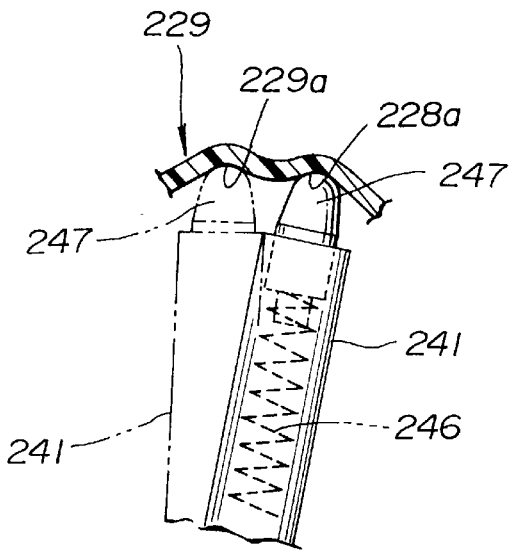
FIG. 38 is a view for explaining an operation of the moderate limit forming portion during a switching of a gear shift mode into a manual gear shift mode.
Figure 39:
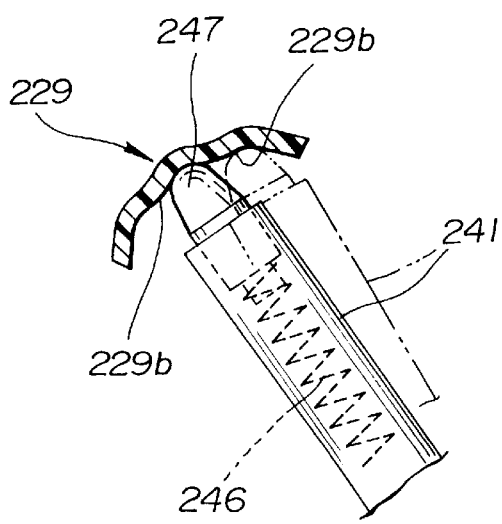
FIG. 39 is a view for explaining an operation of the neutral limit forming portion during the manual gear shift position.
Figure 40:
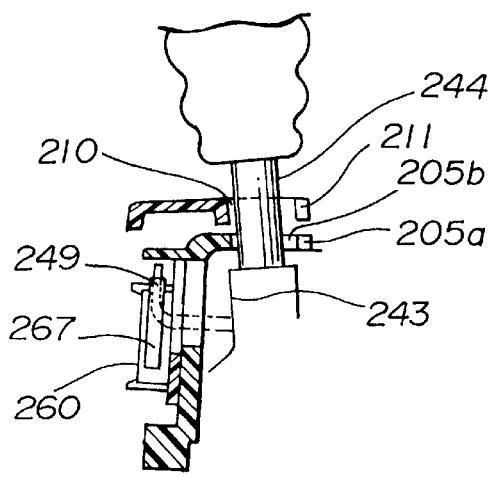
FIG. 40 is a side view, partly in cross section, of a projection of the shift lever device according to the present invention.

FIG. 38 shows an explanatory view of the moderate limit forming portion 228 and FIG. 39 shows the same of the neutral limit portion 229. FIG. 40 shows the second projection 249 which is entered into the space provided in the unit bracket 264.

When the shift lever 201 is put in the A/T mode, that is, when the fitting portion 243 of the shift lever upper body 204 and the upper end of the shift lever lower body 203 are integrally fitted together, the shift lever 201 is pivoted via the axial support 220 of the base bracket in the fore-and-aft direction along the shift groove 205 with the shaft portion 233 as a center. When the shift lever 201 is moved, the slide member 247 is moved on the convex and recess portions of the moderate limiting portion 228 as shown in FIG. 37 so that the driver feels as if he or she were operating the shift lever 201 with a moderate feeling.

It is noted that, for example, at a P (Parking) range, when the press button 256 of the knob 251 is pressed the compression rod 216 falls down against the biasing force exerted by a coil spring 205 to press the lower rod 222 to make the position pin 219 fall down along with the elongated hole 18. When the press button 256 is released, the lower rod 222 is drawn in the upper direction by means of the coil spring 223 and the compression rod 216 is drawn in the upper direction by means of the coil spring 255 by means of the compression rod 216, respectively. Accordingly, the position pin 219 is also moved in the upper direction of the elongated hole 218.

On the other hand, in order to select the manual gear (M/T) shift mode, the knob 251 is used to make the shift lever 201 move at the D range (as shown in FIG. 33) and the knob 251 is tilted in the lateral direction. At this time, the shift lever upper body 204 is pivoted with journal portions 240 and 240 of the shift lever upper body 204 as a center and is pressed by means of the part 242a of the base portion 242 so that the ON state of the limit switch 221 is turned to the OFF state and the OFF state of the limit switch 221 is turned to the OFF state or the ON state fo the limit switch 221. The projection portion 249 is projected externally from the side wall portion 206 from the window hole 266 so as to face with the limit switch 260 fixed onto the side wall protein 6via the unit bracket 264.

At this time, since the lower end of the compression rod 216 is always contactably moved to the slide contact portion 225 from the receiving surface 224 of the lower rod 222, it is made possible to carry out the switching between the automatic gear shift mode and the manual gear shift mode and carry out the manual gear shift mode. In addition, the window hole 245 of the base portion 242 at the shift lever upper body 204 is largely opened so as not to contact against the position pin 219. Both ends of the position pin 218 are contacted with the detent cutout portions 207 and 207 so as to be weighted (the detent cutout portions 207 and 207 are formed mutually and approximated in the same shape) in order to strengthen their support strengths. Since the pressure of the lock member 212 is released by means of the flange portion 248 of the fitting portion 243 at the shift lever upper body 204, the lock member 212 is swung due to its own weight so that the lever 213 enters into the engagement hold 215 of the side wall portion. Hence, the shift lever lower body 203 is fixed at the D range. In addition, as viewed from FIG. 38, the slide member 247 slides from the valley 228a corresponding to the D range of the moderate forming portion 228 in the lateral direction to a center portion (valley 229a) of tehneutral limiting portion 229 so as to hold the shift lever upper body 24 in the neutral position of the manual gear shift mode.

Then, if the knob 251 is moved to the front side of the base bracket 202, the shift lever upper body 204 is pivoted with the collar 225 as a center. When the projection portion 249 is contacted with the actuator 267 so that the limit switch 260 located at the acceleration (+) side is turned ON to shift up the gear shift range. On the contrary, the limit switch 260 located at the minus side (−) is turned ON to reduce the gear shift range. At this time, as view from FIG. 39, the slide member 247 is moved from the center position of the neutral limiting portion 229 to the oblique surface portion 229b so as to compress the coil spring 246. When the knob 251 is released from the drivers' fingers, the biasing force of the coil spring 246 returns the slide member 247 to the center portion (valley 229a) of the neutral limiting portion 229, the neutral portion of the shift lever upper body 204 is held.

In order to return the shift lever 1 from the manual gear shift mode to the automatic gear shift mode, the knob 251 is pivoted so that the shift lever upper body is returned to the original state. At this time, the fitting portion 243 is engaged to the upper part of the shift lever lower body 203. Then, the projection portion 249 is moved from the window hole 266 to the inside of the side wall portion 206 so that the part 242a of the base portion 242 is pressed. The limit switch 221 is turned to ON or OFF so that the lower end of the compression rod 216 is contacted with the receiving surface 224 via an introducing portion 225 of the lower rod 222. In addition, the fitting portion 243 is pivoted so as to press the lock member 212 to be pivoted and the lever lower portion 213 is escaped from the engagement hole 215 of the side wall portion 206. Then, if the knob 251 is moved in the fore-and-aft direction, both of the shift lever upper body 204 and the shift lever lower body 203 are integrated to pivot in the fore-and-aft direction so that the normal automatic gear shift mode can be operated. It is noted that the switching between the manual gear shift mode and the automatic gear shift mode is carried out with the shift lever upper body positioned at the neutral position or D range position, and that the projection portion 249 is contacted with an edge portion of the window hole 266 of the side wall portion 206 so that the shift lever upper body 204 is blocked from being pivoted. Thus, the slide member 247 is moved from a position denoted by a phantom line to a position denoted by a solid line of FIG. 38.

As described before, only the shift lever upper body 204 is pivoted when the automatic gear shift mode is switched to the manual gear shift mode with the shift lever lower body 203 maintained at the original position. Thus, even the position pin does not tilt accordingly. Hence, it is not necessary to form a space required for the position pin 219 to moved so that a lateral width of the base bracket 202 can be reduced.

Hence, since the provision of the moderate feeling at each shift position in the automatic gear shift mode, the returning of the shift lever in the manual gear shift mode, and the provisions of the moderate feeling for the driver to switch the operation mode from the automatic gear shift mode to the manual gear shift mode is carried out by the slide member. Consequently, the reduction of the parts and saving in the space can be achieved.

Since the position pin engaged to the shift slot is always and integrally operated with the shift cable and the position pin is supported on the detent cutout portions so as to be weighted thereon, an error in position between the shifted position on the indicator and that on the automatic power transmission can be reduced and a play generated on the shift lever can be reduced. Furthermore, since the lock member is installed on the shift lever lower body which is engaged on the base bracket, the movements of the shift lever lower body and the shift cable during the mode switching to the manual gear shift mode can be prevented.

What is claimed is:

1. A shift lever device for an automotive automatic transmission comprising:

a base bracket adapted to be fixed on a vehicle floor, said base bracket having an automatic mode shift slot, a manual mode shift slot parallel to the automatic mode shift slot, and a switching slot connecting the automatic mode shift slot and the manual mode shift slot;

a shift lever supported to said base bracket so as to be swingable in the fore-and-aft direction of an automotive vehicle, said shift lever being extended over said base bracket so as to be movable through the automatic mode shift slot, the manual shift slot and the switching slot;

a selector lever adapted to be interconnected with the automatic transmission through a linkage so as to change a shift position in an automatic shift mode, said selector lever being integrally swung with said shift lever when said shift lever is put in the automatic mode shift slot, said selector lever being released from said shift lever when said shift lever is put in the manual mode shift slot to electrically execute an up-shift and a down-shift through a fore-and-aft direction swing of said shift lever; and a position pin installed to said shift lever so as to be vertically movable by manual pushing, said position being hooked to a pair of opposed detent cutout portions formed in said base bracket when said shift lever is put in the automatic mode shift slot.

2. A shift lever device as claimed in claim 1, wherein said shift lever includes a shift lever upper body and a shift lever lower body integral with said selector lever, said shift lever lower body being arranged so as to be engaged to said shift lever upper body, said base bracket having a first axial support on which said shift lever lower body is pivotally supported along the automatic mode shift slot, together with the engaged shift lever upper body, said shift lever lower body having an elongated hole through which said position pin is engaged to said shift lever lower body so as to be movable in a vertical direction of the shift lever lower body, and said shift lever upper body having a second axial support whose axial direction is approximately orthogonal to that of said first axial support of said base bracket structure and through which said shift lever upper body disengaged from said shift lever lower body is pivoted along the switching slot, said shift lever upper body having a first projection projecting therefrom and enterable into a space formed between a pair of first electric switches when said shift lever upper body is pivoted along the manual mode shift slot.

3. A shift lever device as claimed in claim 1, wherein said selector lever has an opening to which a position pin is inserted and a pin guide piece which is installed to a periphery of the opening.

4. A shift lever device as claimed in claim 1, wherein the position pin is connected to the detent cutout portion through an opening of said selector lever, the opening being formed so as to allow vertical movement of said position pin when the shift lever is put in the automatic mode shift slot and the allow swing movement in fore-and-aft direction of the position pin when the shift lever is put in the manual mode shift slot.

5. A shift lever device as claimed in claim 1, wherein a lever portion is installed to said shift lever so as to be in contact with an inside surface of a side wall of said base bracket when said shift lever is put in the automatic mode shift slot and to project from the side wall through an opening when said shift lever is put in the manual mode shift slot.

6. A shift lever device as claimed in claim 1, wherein a stopper portion is formed at the inner surface of the side wall of the base bracket, the lever portion being in contact with the stopper portion when said shift lever is swung in the lateral direction while being put in the automatic mode shift slot and being offset from a position corresponding to the switching slot.

7. A shift lever device as claimed in claim 1, wherein a ball-head shaft is installed to said shift lever so as to be upwardly biased by a spring and to slide on a moderate feeling generating portion formed inside of said base bracket, the moderate feeling generating including a circular arc portion on which the ball-head shaft is slid when said shift lever is put in the automatic mode shift slot, and a neutral limiting portion to which the ball-head shaft is set so that said shift lever is put at a neutral position of the manual mode shift slot.

8. A shift lever device as claimed in claim 7, wherein the ball-head shaft is made by connecting a pair of sliding portions through a shaft portion and by installing a ball-like portion to one sliding portion to contact with the moderate feeling generating portion.

9. A shift lever device as claimed in claim 7, wherein the neutral limiting portion is formed by a valley portion including a pair of oblique surfaces extended in the fore-and-aft direction of said base bracket.

10. A shift lever device as claimed in claim 7, wherein each of the circular arc portion and the neutral limiting portion has a groove which extends in the fore-and-aft direction and a convex cross-section, the head portion of the ball-head shaft being located at the center of the groove so as to slide in the fore-and-aft direction.

11. A shift lever device as claimed in claim 7, wherein each of the circular arc portion and the neutral limiting portion is formed by a laterally inclined surface to laterally bias the ball-head shaft.

12. A shift lever device as claimed in claim 1, wherein a rotation axis shaft of said shift lever is rotatably connected with a rotation axis shaft of said selector lever by forming a small diameter portion at an end of the shift lever rotation axis shaft and be engaging it to the selector lever rotation axis shaft.

13. A shift lever device as claimed in claim 2, wherein a rotation axis shaft of said selector lever is rotatably inserted to a rotation axis shaft of said shift lever, the shift lever rotation axis shaft being formed such that an end portion of the shift lever rotation axis shaft has a plurality of cutout portions at equal intervals, the end portion including the cutout portions being rotatablly engaged with the shift lever.

14. A shift lever device as claimed in claim 1, wherein said shift lever has a projecting portion which is formed in the vicinity of a hole for the position pin and which is engaged with an opening formed on said selector lever.

15. A shift lever device as claimed in claim 2, wherein said automatic mode shift slot is adapted to extend in the fore-and-aft direction of the vehicle and wherein said shift lever lower body is adapted to be linked to an automatic transmission gear shift cable.

16. An operational lever device as claimed in claim 2, further comprising a lower rod, a compression rod, and a first hole provided in said shift lever lower body, said lower rod extending into said first hole and having a second hold through which said position pin is penetrated, said position pin penetrating through said elongated hole of said shift lever lower body, and a third hole provided in said shift lever upper body, said compression rod being inserted into said third hole and being movable in a vertical direction of said shift lever upper body, said lower rod having an upper surface for receiving a lower end of said compression rod and a slidably contacted portion integrally formed adjacent to said upper surface of the lower rod so that the lower end of said compression rod contacts and slides thereon when said shift lever upper body is moved along the manual mode shift slot.

17. A shift lever device as claimed in claim 16, further comprising a lock member swingably attached onto an upper end of said shift lever lower body for locking said shift lever lower body to a particular position of an automatic gear shift range in the automatic mode shift slot when said shift lever upper body is disengaged from said shift lever and is moved in the switching slot and in the manual mode shift slot.

18. A shift lever device as claimed in claim 17, wherein said lock member has an axle swingably attached to the upper end of said shift lever lower body, a roller portion resting on a groove formed on said shift lever lower body when said shift lever upper body is engaged with said shift lever lower body, and a lever portion engaging an engagement hole formed on a side wall of said base bracket when said shift lever upper body is disengaged from said shift lever lower body and is moved in the manual mode shift slot.

19. A shift lever device as claimed in claim 18, wherein said lever portion of the lock member is heavier than said roller portion.

* * * * *